US012180361B2

(12) United States Patent
Witmer et al.

(10) Patent No.: US 12,180,361 B2
(45) Date of Patent: *Dec. 31, 2024

(54) RECYCLED POLYURETHANE FORMULATIONS

(71) Applicant: Checkerspot, Inc., Alameda, CA (US)

(72) Inventors: Garrett Witmer, Salt Lake City, UT (US); Daniel Malmrose, Salt Lake City, UT (US); Neal Anderson, Salt Lake City, UT (US); Charles Rand, Holladay, UT (US); Scott Franklin, Woodside, CA (US)

(73) Assignee: Checkerspot, Inc., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,568

(22) Filed: Jun. 30, 2023

(65) Prior Publication Data

US 2023/0340250 A1 Oct. 26, 2023

Related U.S. Application Data

(63) Continuation of application No. PCT/US2022/050412, filed on Nov. 18, 2022.

(60) Provisional application No. 63/281,300, filed on Nov. 19, 2021.

(51) Int. Cl.
*C08L 63/00* (2006.01)

(52) U.S. Cl.
CPC ......... *C08L 63/00* (2013.01); *C08L 2205/025* (2013.01); *C08L 2205/035* (2013.01)

(58) Field of Classification Search
CPC ......... C08L 63/00–10; C08L 75/04–16; C08L 2205/02; C08L 2205/025; C08L 2205/03; C08L 2205/035; C08L 71/12; C08L 79/08; C08K 2207/20; C08K 7/14; B29K 2071/12; B29K 2079/085; B32B 27/281; B32B 27/285; C08G 2650/40
See application file for complete search history.

(56) References Cited

U.S. PATENT DOCUMENTS

| | | | |
|---|---|---|---|
| 2,059,052 A | 10/1936 | Sperr, Jr. | |
| 4,248,802 A | 2/1981 | Kuntz | |
| 4,349,904 A | 9/1982 | Janssen et al. | |
| 4,545,941 A | 10/1985 | Rosenburg | |
| 5,130,404 A | 7/1992 | Freeland | |
| 6,107,433 A | 8/2000 | Petrovic et al. | |
| 6,414,172 B1 | 7/2002 | Garces et al. | |
| 6,562,933 B2 | 5/2003 | Ohmori et al. | |
| 6,630,534 B1 | 10/2003 | Tanaka et al. | |
| 7,799,835 B2 | 9/2010 | Smith et al. | |
| 7,883,882 B2 | 2/2011 | Franklin et al. | |
| 7,935,515 B2 | 5/2011 | Franklin et al. | |
| 8,187,860 B2 | 5/2012 | Franklin et al. | |
| 8,222,010 B2 | 7/2012 | Franklin et al. | |
| 8,268,610 B2 | 9/2012 | Franklin et al. |
| 8,435,767 B2 | 5/2013 | Franklin et al. |
| 8,450,083 B2 | 5/2013 | Day et al. |
| 8,476,059 B2 | 7/2013 | Trimbur et al. |
| 8,497,116 B2 | 7/2013 | Trimbur et al. |
| 8,512,999 B2 | 8/2013 | Trimbur et al. |
| 8,518,689 B2 | 8/2013 | Trimbur et al. |
| 8,557,249 B2 | 10/2013 | Brooks et al. |
| 8,592,188 B2 | 11/2013 | Franklin et al. |
| 8,633,012 B2 | 1/2014 | Franklin et al. |
| 8,647,397 B2 | 2/2014 | Trimbur et al. |
| 8,674,180 B2 | 3/2014 | Franklin et al. |
| 8,697,402 B2 | 4/2014 | Trimbur et al. |
| 8,697,427 B2 | 4/2014 | Franklin et al. |
| 8,765,424 B2 | 7/2014 | Franklin et al. |
| 8,772,575 B2 | 7/2014 | Franklin et al. |
| 8,790,914 B2 | 7/2014 | Trimbur et al. |
| 8,802,422 B2 | 8/2014 | Trimbur et al. |
| 8,822,176 B2 | 9/2014 | Day et al. |
| 8,822,177 B2 | 9/2014 | Day et al. |
| 8,846,375 B2 | 9/2014 | Franklin et al. |
| 8,852,885 B2 | 10/2014 | Franklin et al. |
| 8,871,985 B2 | 10/2014 | Van Vliet et al. |
| 8,889,401 B2 | 11/2014 | Trimbur et al. |
| 8,889,402 B2 | 11/2014 | Trimbur et al. |
| 8,945,908 B2 | 2/2015 | Franklin et al. |
| 8,951,777 B2 | 2/2015 | Franklin et al. |
| 9,062,294 B2 | 6/2015 | Franklin et al. |
| 9,066,527 B2 | 6/2015 | Franklin et al. |
| 9,068,213 B2 | 6/2015 | Franklin et al. |
| 9,102,973 B2 | 8/2015 | Franklin et al. |

(Continued)

FOREIGN PATENT DOCUMENTS

CN 105153676 A * 12/2015
CN 110305466 A * 7/2019

(Continued)

OTHER PUBLICATIONS

CN 105153676 A machine translation (Dec. 2015).*
CN 110305466 A machine translation (Jul. 2019).*
Co-pending U.S. Appl. No. 18/241,561, inventors Franklin; Scott et al., filed Sep. 1, 2023.
Co-pending U.S. Appl. No. 18/366,323, inventor Franklin; Scott, filed Aug. 7, 2023.
Co-pending U.S. Appl. No. 18/450,573, inventors Petrovic; Zoran et al., filed Aug. 16, 2023.
Co-pending U.S. Appl. No. 18/486,450, inventors Rand; Charles et al., filed Oct. 13, 2023.
Co-pending U.S. Appl. No. 18/501,505, inventors Parker; Leon et al., filed Nov. 3, 2023.

(Continued)

*Primary Examiner* — Ana L. Woodward
(74) *Attorney, Agent, or Firm* — Banner & Witcoff, Ltd.

(57) ABSTRACT

Provided herein are conglomerate resin compositions, methods for the creation of conglomerate resins made from waste stream materials, and incorporation of conglomerate resins in the construction of sporting goods equipment, including, for example, alpine skis, touring skis, cross country skis, approach skis, split boards, snowboards, and water skis.

22 Claims, 11 Drawing Sheets

(56) References Cited

U.S. PATENT DOCUMENTS

| | | |
|---|---|---|
| 9,109,239 B2 | 8/2015 | Franklin et al. |
| 9,200,307 B2 | 12/2015 | Franklin et al. |
| 9,249,252 B2 | 2/2016 | Ngantung et al. |
| 9,249,436 B2 | 2/2016 | Franklin et al. |
| 9,249,441 B2 | 2/2016 | Franklin et al. |
| 9,255,282 B2 | 2/2016 | Franklin et al. |
| 9,279,136 B2 | 3/2016 | Franklin et al. |
| 9,328,351 B2 | 5/2016 | Franklin et al. |
| 9,353,389 B2 | 5/2016 | Franklin et al. |
| 9,375,703 B2 | 6/2016 | Harlin et al. |
| 9,388,435 B2 | 7/2016 | Franklin et al. |
| 9,493,640 B2 | 11/2016 | Cernohous et al. |
| 9,499,652 B2 | 11/2016 | Spies et al. |
| 9,518,277 B2 | 12/2016 | Franklin et al. |
| 9,551,017 B2 | 1/2017 | Franklin et al. |
| 9,567,615 B2 | 2/2017 | Davis |
| 9,593,351 B2 | 3/2017 | Franklin et al. |
| 9,649,368 B2 | 5/2017 | Franklin et al. |
| 9,657,299 B2 | 5/2017 | Franklin et al. |
| 9,758,757 B2 | 9/2017 | Harlin et al. |
| 9,796,949 B2 | 10/2017 | Dummer et al. |
| 9,909,155 B2 | 3/2018 | Franklin et al. |
| 10,006,034 B2 | 6/2018 | Franklin et al. |
| 10,053,646 B2 | 8/2018 | Schiff-Deb et al. |
| 10,053,715 B2 | 8/2018 | Franklin et al. |
| 10,100,341 B2 | 10/2018 | Franklin et al. |
| 10,125,382 B2 | 11/2018 | Casolari et al. |
| 10,138,435 B2 | 11/2018 | Trimbur et al. |
| 10,167,489 B2 | 1/2019 | Franklin et al. |
| 10,260,076 B2 | 4/2019 | Franklin et al. |
| 10,287,613 B2 | 5/2019 | Franklin et al. |
| 10,316,299 B2 | 6/2019 | Davis et al. |
| 10,344,305 B2 | 7/2019 | Franklin et al. |
| 10,442,922 B2 | 10/2019 | Fudemoto et al. |
| 10,557,114 B2 | 2/2020 | Rudenko et al. |
| 10,683,522 B2 | 6/2020 | Franklin et al. |
| 11,118,134 B2 | 9/2021 | Franklin |
| 11,208,369 B2 | 12/2021 | Petrovic et al. |
| 11,352,602 B2 | 6/2022 | Wee et al. |
| 11,667,870 B2 | 6/2023 | Franklin |
| 11,673,850 B2 | 6/2023 | Petrovic et al. |
| 11,691,382 B2 | 7/2023 | Sterbenz et al. |
| 11,873,405 B2 | 1/2024 | Parker et al. |
| 2004/0241392 A1 | 12/2004 | Sorrentino |
| 2005/0143508 A1 | 6/2005 | Tyagi et al. |
| 2006/0264568 A1 | 11/2006 | Pajerski |
| 2007/0117947 A1 | 5/2007 | Wehner |
| 2008/0118992 A1 | 5/2008 | Bellini et al. |
| 2009/0260754 A1 | 10/2009 | Te |
| 2010/0267925 A1 | 10/2010 | Abraham et al. |
| 2010/0311992 A1 | 12/2010 | Petrovic et al. |
| 2011/0015292 A1 | 1/2011 | Radhakrishnan et al. |
| 2011/0113679 A1 | 5/2011 | Cohen et al. |
| 2011/0256282 A1 | 10/2011 | Piechocki et al. |
| 2012/0073186 A1 | 3/2012 | Knuth et al. |
| 2012/0130039 A1 | 5/2012 | Millero, Jr. et al. |
| 2012/0135479 A1 | 5/2012 | Dillon et al. |
| 2012/0196079 A1 | 8/2012 | Brauers et al. |
| 2013/0053463 A1 | 2/2013 | Gramellini et al. |
| 2013/0131222 A1 | 5/2013 | Gross |
| 2013/0323382 A1 | 12/2013 | Franklin et al. |
| 2013/0338385 A1 | 12/2013 | Franklin et al. |
| 2014/0145374 A1 | 5/2014 | Altonen et al. |
| 2014/0178950 A1 | 6/2014 | Franklin et al. |
| 2014/0256600 A1 | 9/2014 | Dillon et al. |
| 2014/0288636 A1 | 9/2014 | Headley, Jr. et al. |
| 2016/0002566 A1 | 1/2016 | Vanhercke et al. |
| 2016/0009852 A1 | 1/2016 | Yu et al. |
| 2016/0176800 A1 | 6/2016 | Schiff-Deb et al. |
| 2016/0193793 A1 | 7/2016 | Filippini |
| 2016/0194584 A1 | 7/2016 | Ngantung et al. |
| 2016/0242371 A1 | 8/2016 | Prissok |
| 2016/0312151 A1 | 10/2016 | Narine et al. |
| 2016/0348119 A1 | 12/2016 | Franklin et al. |
| 2017/0240253 A1 | 8/2017 | Woo |
| 2017/0335057 A1 | 11/2017 | Tabor et al. |
| 2018/0127350 A1 | 5/2018 | Hapiot et al. |
| 2018/0163170 A1 | 6/2018 | Wee et al. |
| 2018/0237811 A1 | 8/2018 | Franklin et al. |
| 2020/0255629 A1 | 8/2020 | Sahajwalla et al. |
| 2021/0130858 A1 | 5/2021 | Franklin et al. |
| 2021/0244064 A1 | 8/2021 | Brooks et al. |
| 2021/0246434 A1 | 8/2021 | Ko et al. |
| 2022/0119735 A1 | 4/2022 | Franklin |
| 2022/0324198 A1 | 10/2022 | Sterbenz et al. |
| 2022/0356292 A1 | 11/2022 | Sterbenz et al. |
| 2023/0167224 A1 | 6/2023 | Franklin et al. |

FOREIGN PATENT DOCUMENTS

| | | |
|---|---|---|
| CN | 106995519 B | 9/2019 |
| DE | 202006018792 U1 | 4/2008 |
| JP | 2009114247 A | 5/2009 |
| JP | 2011516634 A | 5/2011 |
| JP | 2014500349 A | 1/2014 |
| JP | 2015521033 A | 7/2015 |
| JP | 2018509516 A | 4/2018 |
| KR | 101296172 B1 | 8/2013 |
| WO | WO-0238375 A2 | 5/2002 |
| WO | WO-2006094227 A2 * | 9/2006 |
| WO | WO-2008151149 A2 | 12/2008 |
| WO | WO-2009117665 A2 | 9/2009 |
| WO | WO-2010006032 A1 | 1/2010 |
| WO | WO-2010045368 A2 | 4/2010 |
| WO | WO-2010063031 A2 | 6/2010 |
| WO | WO-2010063032 A2 | 6/2010 |
| WO | WO-2010120923 A1 | 10/2010 |
| WO | WO-2010120939 A2 | 10/2010 |
| WO | WO-2011150410 A2 | 12/2011 |
| WO | WO-2011150411 A1 | 12/2011 |
| WO | WO-2012061647 A2 | 5/2012 |
| WO | WO-2012106560 A1 | 8/2012 |
| WO | WO-2013057604 A1 | 4/2013 |
| WO | WO-2013082186 A2 | 6/2013 |
| WO | WO-2013138161 A1 | 9/2013 |
| WO | WO-2013158938 A1 | 10/2013 |
| WO | WO-2014124967 A1 | 8/2014 |
| WO | WO-2014176515 A2 | 10/2014 |
| WO | WO-2014186395 A1 | 11/2014 |
| WO | WO-2015051319 A2 | 4/2015 |
| WO | WO-2020047216 A1 | 3/2020 |
| WO | WO-2020167745 A1 | 8/2020 |
| WO | WO-2021127181 A1 | 6/2021 |
| WO | WO-2021150923 A1 | 7/2021 |
| WO | WO-2021247368 A1 | 12/2021 |
| WO | WO-2022221402 A1 | 10/2022 |
| WO | WO-2023043945 A1 | 3/2023 |
| WO | WO-2023043945 A2 | 3/2023 |
| WO | WO-2023091669 A1 | 5/2023 |
| WO | WO-2023043945 A3 | 6/2023 |
| WO | WO-2023102069 A1 | 6/2023 |
| WO | WO-2023196923 A1 | 10/2023 |
| WO | WO-2023212726 A2 | 11/2023 |
| WO | WO-2023212726 A3 | 12/2023 |

OTHER PUBLICATIONS

Co-pending U.S. Appl. No. 18/515,988, inventor Franklin; Scott, filed Nov. 21, 2023.

Co-pending U.S. Appl. No. 18/519,816, inventors Petrovic; Zoran et al., filed Nov. 27, 2023.

Szabo et al. Safety evaluation of oleic-rich triglyceride oil produced by a heterotrophic microalgal fermentation process. Food and Chemical Toxicology 65 (2014) 301-311. Available online Jan. 3, 2014.

Co-pending U.S. Appl. No. 17/396,876, inventor Franklin; Scott, filed Aug. 9, 2021.

Co-pending U.S. Appl. No. 18/156,929, inventors Parker; Leon et al., filed Jan. 19, 2023.

Co-pending U.S. Appl. No. 18/304,085, inventor Franklin; Scott, filed Apr. 20, 2023.

Co-pending U.S. Appl. No. 18/310,329, inventors Petrovic; Zoran et al., filed May 1, 2023.

(56) References Cited

OTHER PUBLICATIONS

Co-pending U.S. Appl. No. 18/317,748, inventors Sterbenz; Matthew et al., filed May 15, 2023.
Co-pending U.S. Appl. No. 18/345,591, inventors Witmer; Garrett et al., filed Jun. 30, 2023.
Lin et al. Genetic engineering of microorganisms for biodiesel production. Bioengineered. Sep. 1, 2013; 4(5): 292-304. Published online Dec. 6, 2012. doi: 10.4161/bioe.23114.
Patel et al. High conversion and productive catalyst turnovers in cross-metathesis reactions of natural oils with 2-butene. Green Chemistry, vol. 8, No. 5, pp. 450-454 (2006). First published online Mar. 22, 2006. DOI: https://doi.org/10.1039/B600956E.
PCT/US2022/050412 International Search Report and Written Opinion dated Feb. 22, 2023.
Petrović et al. Polyols and Polyurethanes from Crude Algal Oil. Journal of the American Oil Chemists' Society, vol. 90, Issue 7, pp. 1073-1078 (Jul. 2013). First published Apr. 18, 2013. doi: https://doi.org/10.1007/s11746-013-2245-9.
Petrović. Polyurethanes from Vegetable Oils. Polymer Reviews 48:109-155 (2008).
Shi et al. Metabolic Engineering of Oleaginous Yeasts for Production of Fuels and Chemicals. Front Microbiol. 2017; 8: 2185. Published online Nov. 8, 2017. doi: 10.3389/fmich.2017.02185. 16 pages.
Uprety et al. Utilization of microbial oil obtained from crude glycerol for the production of polyol and its subsequent conversion to polyurethane foams. Bioresour Technol. Jul. 2017;235:309-315. doi: 10.1016/j.biortech.2017.03.126. Epub Mar. 24, 2017.
U.S. Appl. No. 18/345,591 Office Action dated Jan. 11, 2024.

\* cited by examiner

RECYCLED POLYURETHANE FORMULATIONS

CROSS-REFERENCE

This application is a continuation of International Application No. PCT/US2022/050412, filed on Nov. 18, 2022, which claims the benefit of U.S. Provisional Application No. 63/281,300, filed on Nov. 19, 2021, each of which is incorporated herein by reference in its entirety.

BACKGROUND

Polyurethanes (PU) can be produced via the condensation of a hydroxyl functionality, such as a polyol, with an isocyanate moiety. As a polymer class, polyurethanes are quite diverse and unique among plastics as the chemical structure of polyurethanes is not a highly repetitive unit. As a consequence, polyurethanes having the same general physical properties can have dramatically different chemical compositions. Because of their diverse structural makeup, polyurethanes come in myriad forms and are used for the production of resins, films, coatings, hard and soft foams, sealants, adhesives, and elastomers.

Most polyols are typically derived from petroleum feedstocks. However, as the global climate continues to warm, and with little doubt remaining as to the direct correlation between the increased utilization of fossil fuels over the past millennium and the imminent threat posed by a warming climate, there is an urgent need to replace incumbent, petroleum derived fuels and chemicals with more sustainable, renewable materials. The polyol components of polyurethanes present an opportunity for renewable alternatives with novel functionalities.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY

In some aspects, the present disclosure provides a conglomerate resin, comprising:
a) a waste stream material, wherein the waste stream material comprises a polyurethane, wherein the waste stream material is from about 50% to about 90% weight by weight (w/w) of the conglomerate resin;
b) an epoxy resin, wherein the epoxy resin is from about 1% to about 25% w/w of the conglomerate resin; and
c) a hardener, wherein the hardener is from about 1% to about 25% w/w of the conglomerate resin.

In some aspects, the present disclosure provides a conglomerate resin, comprising:
a) a waste stream material, wherein the waste stream material comprises:
   i) one or more species of wood at an amount of from about 1% to about 60% w/w of the waste stream material; and
   ii) a cast polyurethane at an amount of from about 1% to about 50% w/w of the waste stream material; and
   iii) a polyurethane foam at an amount of from about 1% to about 50% w/w of the waste stream material;
b) an epoxy resin; and
c) a hardener.

In some aspects, the present disclosure provides a conglomerate resin, comprising:
a) a waste stream material, wherein the waste stream material comprises:
   i) fiberglass at an amount of from about 1% to about 50% w/w of the waste stream material;
   ii) a recycled epoxy resin at an amount of from about 1% to about 30% w/w of the waste stream material;
   iii) nylon at an amount of from about 1% to about 20% w/w of the waste stream material;
   iv) one or more species of wood at an amount of from about 1% to about 50% w/w of the waste stream material;
   v) a cast polyurethane at an amount of from about 1% to about 50% w/w of the waste stream material; and
   vi) a polyurethane foam at an amount of from about 1% to about 50% w/w of the waste stream material;
b) an epoxy resin; and
c) a hardener.

In some aspects, the present disclosure provides a boot plate comprising the conglomerate resin described in any one of the aspects above.

In some aspects, the present disclosure provides a display stand (e.g., a display stand for skis) comprising the conglomerate resin of any one of the aspects above.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
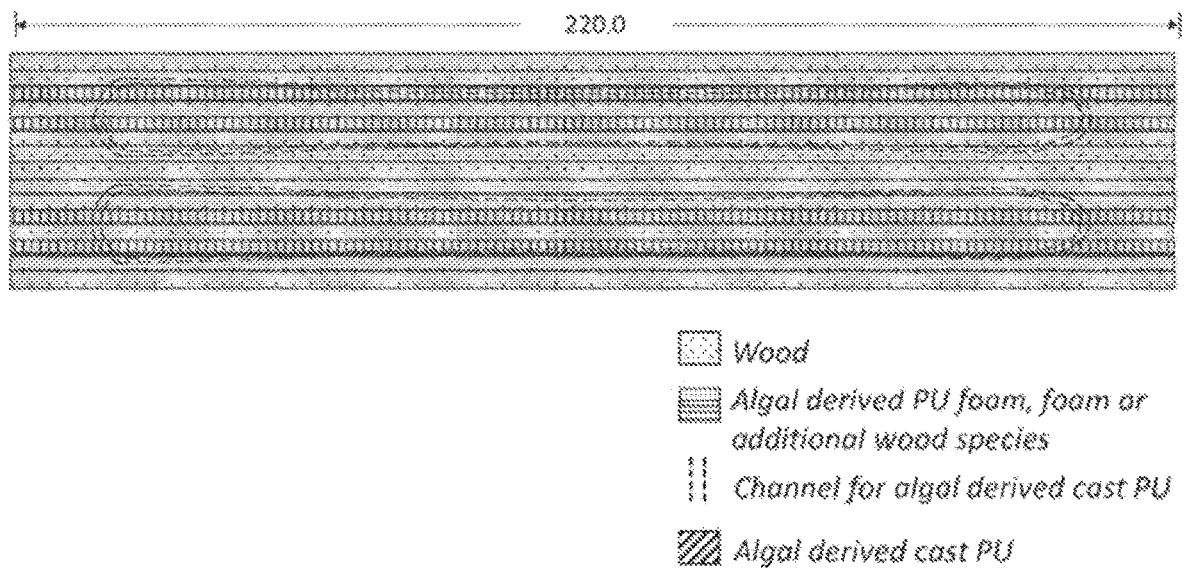
FIG. 1 shows the general layup and composition of a ski wood composite core as well as a cross-section of the core in various stages of manufacture. Panel A depicts the longitudinal section, comprised of a wood foam composite. The channel, to be Computer Numerically Control (CNC) routed for the introduction of a suitable pourable cast urethane or thermoplastic material comprising the sidewall is shown by dashed lines. Panel B shows a composite core construction and dimensions, shown in cross section. Panel C shows an alternative composite core construction and dimensions, shown in cross section. Panel D shows the profile of a ski laminated with additional materials and the points at which excess material can be removed during manufacture.
Figure 1B:
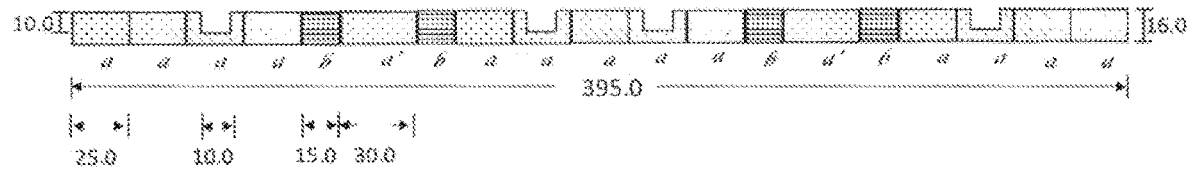
Figure 1C:
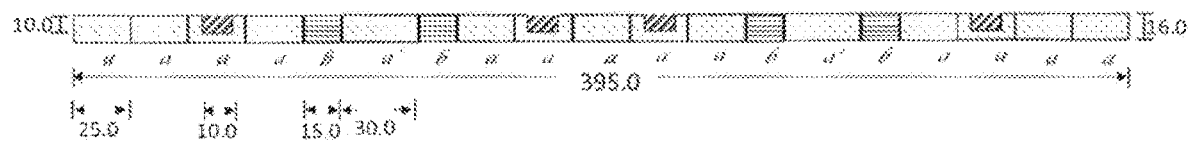
Figure 1C:
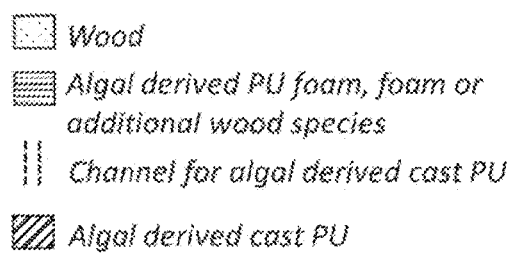
Figure 1D:
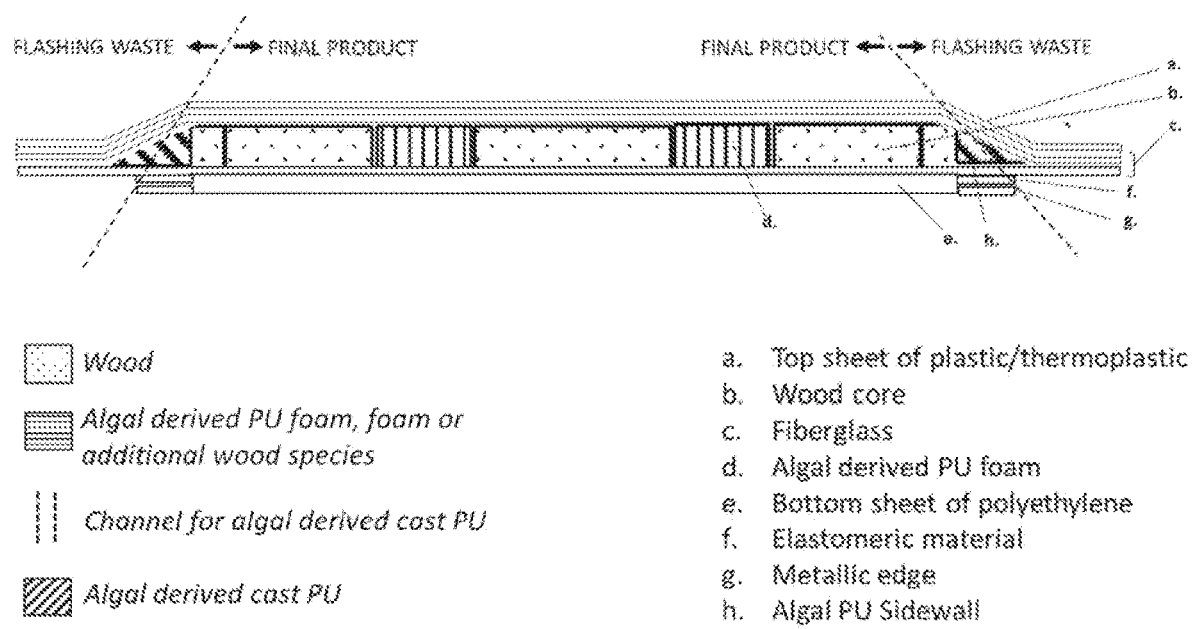

Disclosed herein are conglomerate resins made from waste stream materials used as a means of manufacturing materials from their own waste streams. For example, conglomerate resins described herein can include recycled cast PU, PU foam, fiberglass, epoxy resin, wood, rubber, nylon, sawdust, ultrahigh molecular weight polyethylene (UHMWPE), thermoplastic polyurethane (TPU), polyesters, acrylonitrile butadiene styrene (ABS), or other plastic materials. These waste streams contain materials that can be repurposed to create an increased amount of finished product, for example, in the manufacture of sporting goods equipment.

Conglomerate waste stream resins can be used alone or in combination with other materials used in sporting goods equipment including, for example, skis, alpine skis, touring skis, cross country skis, approach skis, skateboards, kiteboards, split boards, wakeboards, surfboards, paddleboards, snowboards, or water skis. Further described herein are methods of producing conglomerate resins from waste stream materials. These methods include processing of waste stream flashings and incorporation thereof with an epoxy and a hardener to produce a casted conglomerate resin. The casted conglomerate resin can be further processed, machined, or finished prior to use in an end-product described herein. Non-limiting examples of end products include boot plates, display stands, ski stands (kiosks), tail blocks, ski core stringers (as a wood or PU foam replacement).

In resin casting, a liquid resin is poured into a preconstructed mold and allowed to cure or set until solidified. Resin casting kits generally come as a two-part system: one part is the resin and the other part is the hardener that solidifies the resin when mixed together. As used herein, the term "epoxy resin" or "epoxy" or "resin" generally refers to the liquid resin to be casted in a mold. In some embodiments, an A-side component of a cast formulation comprises the epoxy resin. As used herein, the term "hardener" generally refers to the curing component for curing the liquid epoxy resin. In some embodiments, a B-side component of a cast formulation comprises a hardener.

As used herein, the term "conglomerate resin" generally refers to a cast resin comprised of waste stream materials, an epoxy resin, and a hardener. Conglomerate resins described herein comprise of waste stream materials derived from ski manufacture.

As used herein, the term "flashing material", "flashings", or "recycled material" generally refers to waste stream materials derived from end product manufacturing processes, e.g., ski manufacturing. These waste stream materials can be recycled as conglomerate resins for construction of one or more parts of end products. Non-limiting examples of materials comprised in flashings include recycled epoxy resin, fiberglass, wood, foam, PU, UHMWPE, ABS, and other plastics.

As used herein, the term "recycled epoxy resin" or "solid epoxy resin" refers to cured epoxy resin from waste stream materials that is in a solid state. Recycled epoxy resin and the epoxy resin that are used to formulate a conglomerate resin described herein are distinct materials.

As used herein, the term "microbial oil" refers to an oil produced or extracted from a microorganism (microbe), e.g., an oleaginous, single-celled, eukaryotic, or prokaryotic microorganism, including but not limited to, microalgae, yeast, and bacteria.

As used herein, the term "biobased" generally refers to materials sourced from biomass, biological products, or renewable agricultural material, including plant, animal, and marine materials, forestry materials, or an intermediate feedstock. The term "biobased content" generally refers to an amount of carbon in a material that is derived from biomass. Biobased polyols and resulting products derived therefrom can serve as sustainable, renewable alternatives to petrochemical-based polyols and products. In some embodiments, a biobased oil is an oil obtained from algae or microalgae, i.e., an algal oil. Biobased materials can serve as renewable alternatives to petrochemical materials in PU production. Biobased content of a formulation described herein can be measured on a weight-by-weight basis of the total formulation.

As used herein, the term "triacylglycerol", "triglyceride", or "TAG" refers to esters between glycerol and three saturated and/or unsaturated fatty acids. Generally, fatty acids of TAGs have chain lengths of 8 carbon atoms or more.

As used herein, the term "TAG purity", "molecular purity", or "oil purity" refers to the number of molecular species that make up an oil composition, on an absolute basis or present in amounts above a certain threshold. The fewer the number of TAG species in an oil, the greater the "purity" of the oil.

As used herein, the term "polyol", "biopolyol", "natural oil polyol", or "NOP" generally refers to triglycerols or fatty acid alcohols comprising hydroxyl functional groups. As used herein, the term "polyol derived from a TAG oil" generally refers to a polyol obtained from chemical conversion of a TAG oil, e.g., via epoxidation and ring opening, ozonolysis and reduction, or hydroformylation and reduction. In some embodiments, a pure oil may be an oil comprising up to 9 TAG species and 60% or more of triolein. In some embodiments, a pure oil may be an oil 80% or more of triolein. In some embodiments, a pure oil may comprise up to 4 TAG species present in amounts of above a certain threshold in the oil (e.g., ruling out trace amounts of other TAG) and 90% or more of a single TAG species, such as triolein.

As used herein, the term "polyurethane", "PU", or "urethane" refers to a class of polymers comprised of carbamate (urethane) linkages formed between a polyol and an isocyanate moiety.

As used herein, the term "oleic content", "oleate content", or "olein content" refers the percentage amount of oleic acid in the fatty acid profile of a substance (e.g., a polyol). As used herein, the term "C18:1 content" refers the percentage amount of a C18:1 fatty acid (e.g., oleic acid) in the fatty acid profile of a substance (e.g., a microbial oil).

As used herein, the term "high oleic" can refer to greater than 60% oleic acid, greater than 70% oleic acid, greater than 80% oleic acid, or greater than 90% oleic acid.

As used herein, the term "biobased" generally refers to materials sourced from biological products or renewable agricultural material, including plant, animal, and marine materials, forestry materials, or an intermediate feedstock.

As used herein, the term "biobased carbon content" or "biobased content" generally refers to the percentage carbon from natural, biobased (plant or animal by-product) sources versus synthetic (petrochemical) sources. A biobased carbon content of 100% indicates that a material is entirely sourced from plants or animal by-products, and a biobased carbon content of 0% indicates that a material does not contain any carbon from plants or animal. A value in between represents a mixture of natural and fossil derived sources. In some embodiments, biobased content of a formulation described herein can be assessed on a weight-by-weight basis. In some embodiments, biobased content of a formulation described herein can be assessed by ASTM 6866.

As used herein, the terms "wood-foam" or "foam-wood" composites generally refer to compositions comprising wood and foam. In some embodiments, the composites are constructed by laminating together one or more wood and foam components using an adhesive.

As used herein, the term "cure time" or "curing time" refers to the amount of time in which chemical crosslinking of a casting is complete and the physical properties of the casting do not change over time, e.g., viscosity, glass transition temperature ($T_g$), strength. Curing time can be accelerated by the addition of heat and or pressure.

As used herein, the term "about" refers to ±10% from the value provided.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are described herein.

Waste Stream Compositions and Methods of Production

Flashing materials include waste streams derived from the end product manufacturing, for example, ski manufacturing. The bulk of these materials can be generated from ski layups as outlined in FIG. 1, Panels A-D. Flashing materials can be further processed using a variety of grinding devices. A typical grinder, manufactured by Rapid Granulator, Inc, for example, is capable of processing over 200 kg/hr of flashing waste into a composite, ground material. For example, flashing waste can be reduced to strips of material of about 5-10 cm in width and about 200 cm in length. The composite, ground material can be comprised of fiberglass, cast PU, solid epoxy resin, wood, rubber, and nylon, for example, with a mean particle size of <4 millimeters (mm). The precise composition of these materials can vary depending upon the specific ski/board design and layup which impacts the composition of the final grind. The composition of these materials can comprise sawdust from machining ski cores, ultrahigh molecular weight polyethylene (UHMWPE) from sizing bottom sheets, nylon, thermoplastic polyurethane (TPU), or polyesters, for example, from sizing top sheets and cast urethanes, ABS, or other plastic sidewall materials from finishing, grinding, or routing sidewalls or other ski components. Once processed, these materials can be utilized in a variety of fabricated devices, parts, and materials.

FIG. 1 shows the general layup and composition of a ski wood composite core as well as a cross-section of the core at various stages of manufacture to provide an overview of possible compositions and origins of ski flashing materials. The ski core can have a variety of dimensions and configurations. The longitudinal section shown in Panel A is comprised of a wood, a foam, or a wood foam composite. For example, the foam is an algal-derived polyurethane foam. The channel, to be CNC-routed for the introduction of a suitable pourable cast urethane or thermoplastic material comprising the sidewall of the ski layup, is shown by dashed lines. The composite core can have construction and dimensions shown in cross-sectional views of Panel A that are shown in Panels B and C, for example. Sections or strips of each material can vary in thickness depending upon the exact design of the sporting equipment. Dimensions shown are in mm.

Once laminated, the channel is CNC-routed in the resulting wood, foam, or wood foam composite core to accept a cast urethane or other suitable, flowable plastic, thereby forming the sidewall of the resulting ski. After curing of the plastic sidewall, the composite can be further CNC-machined to the appropriate thickness from tip to tail. As shown in FIG. 1, Panel A, this machining can be carried out on the pair of skis or as a single ski, the pair being separated after profiling.

At the conclusion of the CNC-machining, the profiled ski can be laminated with additional materials, as for example, shown in FIG. 1, Panel D. In one embodiment, the composite core is ensconced within a top sheet comprised of, for example, polyamide, polyester, TPU, or other suitable materials. The composite core is followed by one or more layers of fibrous material including, but not limited to, fiber glass, basalt glass, woven linen, wool or other natural fibers overlaying the wood core. Beneath the wood core is an additional sheet of fibrous material followed by a base layer bottom sheet, typically constructed of UHMWPE or polyethylene. The resulting composite material can be further processed as shown in FIG. 1, Panel D, whereby excess composite materials or flashings are removed by processing on a band-saw, for example. Flashings may include wood, foam, wood-foam composites, elastomeric materials (e.g., rubber), plastic, fiberglass thermoplastic, solid epoxy resins, or other materials used in the manufacture of sporting goods (e.g., skis). This resulting ski, in a rough finished form, can then undergo additional processing steps, including routing and polishing of sidewalls, grinding and tuning of steel edges as well as sanding of bases (comprised of UHMWPE).

Boot Plates

Figure 2:
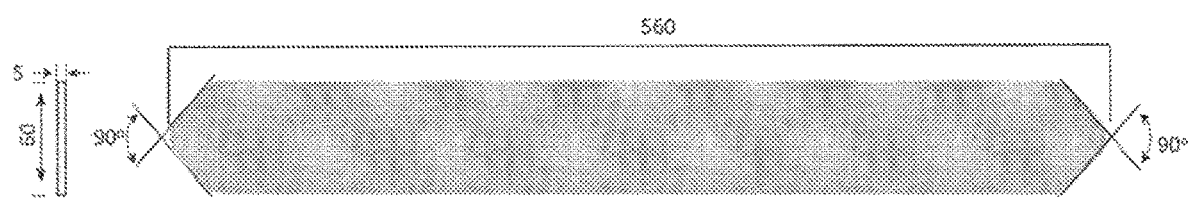
FIG. 2 shows the internal dimensions of a boot plate aluminum mold.

The boot plate is a platform used in many downhill, backcountry, and cross-country skis that provides a solid foundation onto which the ski binding can be affixed, e.g., by use of screws. A typical boot plate design is illustrated in FIG. 2. The approximate dimensions are shown in mm (60 mm×560 mm). Typical materials of construction for a boot plate include hardwoods of sufficient density (e.g., maple, ash, oak) such that the binding screws have ample purchase in the boot plate material. Failure of the boot plate (i.e., bindings pulling out of the plate) can result in a catastrophic failure of the ski or snowboard and serious injury to the rider. As such, use of materials that provide sufficient purchase to the screws can be of critical importance in boot plate construction. Conglomerate resins described herein can be used to construct boot plates.

Materials Testing

A Screw Pull-out Test, also known as a post-installed screw pull-out test or PSP, can be used to assess the suitability of materials for serving as a boot plate insert. The PSP test is a partially destructive technique for testing the anchorage, or pull-out capacity of a material, for example, a conglomerate resin boot plate derived herein. This capacity can be important in situations where the material to be tested is anchored into another material outside the zone of failure.

Pull-out testing involves attaching a suitable test rig (i.e., a boot plate) to a bolt, screw, anchor, or other fixing. The screw is then pulled under tension to test the stress load level and determine the strength of the test rig. Pull-out testing can help determine whether a product (i.e., a boot plate) will fail under general use conditions.

Construction of Skis and Other Sporting Goods Equipment

Skis, snowboards, and other sporting goods equipment can be designed and constructed to impart various functional characteristics, including lightweight, strength, strength-toweight ratio, durability, and flexibility. Heavy skis can be unwieldy and reduce the responsiveness and utility in many applications of these equipment. For example, backcountry skiers or ski mountaineers must ascend on skis using their own locomotion, often for several thousand vertical feet, in difficult terrain, to attain sufficient altitude from which to descend. Thus, lightweighting can be a critical factor in the design of high quality and functional ski equipment. Depending on the materials used and the manner in which skis are constructed, a wide array of skis can be produced to suit to many different styles of skiing, different levels of ability, and differing skier preferences.

The core material, in particular, influences all other characteristics of ski behavior and performance. Traditionally, the core of a ski is made of various kinds of wood laminated together. The types of wood species and manner in which the composite components are arranged can further affect the physical properties of the composite. Wood is used as a core material due to its lightweight, strength, and superior flexibility. Wood is also adept at reducing vibration. The damping property of wood improves the stability of the ski. Many other materials may be added to the wood as laminates, depending on the desired behavior and performance of the final product. Non-limiting examples of other materials include foam, carbon fiber, aluminum, fiberglass, titanium, and Kevlar. The core material is surrounded by a top layer and a bottom layer and reinforced by sidewalls.

The top layer can be composed of layers of plastic and/or fibrous materials, for example, fiberglass.

The bottom layer can be composed of layers of plastic, polyethylene, fiberglass, as well as elastomeric materials. Non-limiting examples of elastomeric materials include polyethylene, rubber, and neoprene. The bottom layer includes a base layer, which can be composed of polyethylene with a metal edge. Non-limiting examples of metals include steel, titanium, aluminum, and an alloy thereof. In some embodiments, the metal edge is composed of steel with a Rockwell Hardness in the range of HRC 45-60. A layer of elastomeric material can sit atop the metal edge, which can help dampen vibrations arising from the metal. In some embodiments, the base layer does not include a metal edge. The sidewall can refer to an area along the edge of a ski above the metal edge that laterally reinforces the core material. FIG. 1, Panel D illustrates a schematic cutaway view of an example ski having a composite core.

The core material can be composed of a conglomerate resin comprised of waste stream materials from prior manufacture, including wood, hydrophobic material overlaid with fiberglass, PU foam, or epoxy resin. In some embodiments, the core material of a sporting goods equipment described herein can be a composite resin material containing PU and a solid material. The PU can be a PU foam. The composite material can be composed of alternating layers of PU foam and a solid material. A solid material can be a fibrous material, for example, wood, fiberglass, carbon fiber, Kevlar, flax, hemp, or wool.

In some embodiments, the core material is composed of PU foam and one of more species of wood. Wood varieties vary in weight, strength, and flexibility. For example, paulownia is ultra-lightweight, but tends not to dampen vibrations as well as other woods. Beech, maple, ash, and fir, for example, are denser and burlier than other wood types, and thus, provide great torsional rigidity and stability. Solid wood cores made of glue-laminated lamellae are commonly used in ski core equipment. Solid wood cores provide desirable strength and flexural (bending) properties, and come in a variety of types, grains, and densities. Flexural properties are defined as the ability to resist fracture, as described, for example, in ASTM method D790. Lamination of wood planks that differ in density and strength allows for optimization for strength and weight of the lamellae.

Non-limiting examples of wood species include *Paulownia* (for example, *Paulownia* sp.), cherry (for example, *Prunus* sp.), birch (for example, *Betula* sp.), alder (for example, *Alnus* sp.), fuma (for example, *Ceiba* sp.), ash (for example, *Fraxinus* sp.), box elder (for example, *Acer negundo*), chestnut (for example, *Castanea* sp.), elm (for example, *Ulmus* sp.), hickory (for example, *Carya* sp.), koa (for example, *Acacia* sp. and *Acacia koa*), mahogany (for example, *Swietenia* sp.), sweetgum (for example, *Liquidambar* sp.), oak (for example, *Quercus* sp.), ash (for example, *Fraxinus* sp.), aspen (for example, *Populus tremuloides*), beech (for example, *Fagus* sp.), maple (for example, *Acer* sp.), poplar (for example, *Populus* sp.), walnut (for example, *Juglans* sp.), pine (for example, *Pinus* sp.), cedar (for example, *Cedrus* sp. and *Libocedrus* sp.), yew, fir (for example, *Abies* sp.), Douglas fir (for example, *Pseudotsuga menziesii*), larch (for example, *Larix* sp.), hardwood, bamboo (for example, *Bambusoideae* sp.), blackwood, bloodwood, basswood, boxelder, boxwood, brazilwood, coachwood, cocobolo, corkwood, cottonwood, dogwood, ironwood, kingwood, lacewood, marblewood, sandalwood, rosewood, zebrawood, ebony, ivory, buckeye, satinwood, kauri, spruce (for example, *Picea* sp.), cypress (for example, *Taxodium* sp.), hemlock (for example, *Tsuga* sp.), redwood (for example, *Sequoia* sp. and *Sequoiadendron* sp.), rimu, teak (for example, *Tectona* sp.), eucalyptus, and willow (*Salix*). In some embodiments, the core material is composed of PU foam and *Paulownia*. In some embodiments, the core material comprises PU foam and aspen. In some embodiments, the core material comprises PU foam, *Paulownia*, and aspen. In some embodiments, a waste stream material described herein includes one or more wood species.

In some embodiments, the composite material is composed of alternating planks of wood and PU foam that are longitudinally layered along the length of the planks, depicted in FIG. 1, Panels A-C. In some embodiments, the composite material is composed of alternating planks of wood and PU foam that are vertically laminated together. Each plank can be affixed to one another by an adhesive or bonding material. Non-limiting examples of adhesives include a polyvinyl acetate based adhesive, an ethylene vinyl acetate based adhesive, a PU based adhesive, a urea-formaldehyde based adhesive, a melamine based adhesive, and a silicone based adhesive. In some embodiments, the planks of a composite can be laminated together with a resin and/or heat. The resin can be an epoxy resin. In some embodiments, a waste stream material described herein includes wood, PU foam, and an adhesive.

Example wood-foam composite layups can be prepared. Foam planks can be prepared and sectioned to various widths. Similarly, wood planks can be prepared and sectioned to various widths, and then combined with the foam planks. In some cases, one or more species of wood can be used.

Sidewalls can provide protection and support to the core of a sporting goods equipment. The sidewall can be composed of a plastic, acrylonitrile butadiene styrene (ABS), PU, polyethylene, rubber, aluminum, wood, or combinations thereof. As such, any one of these materials can be a component of a waste stream material described herein. In some embodiments, the sidewall is composed of PU derived from microbial oil, for example, PU derived from algal oil.

Ski sidewalls can be constructed in various configurations including, for example, cap construction, sandwich construction, half cap construction, and hybrid construction. Cap construction is where the top layer folds over the edges of the core material. Cap construction can be a lightweighting method by the omission of heavy sidewall materials running along the length of the ski. Sandwich construction involves layering of the top sheets, core material, and bottom sheets such that the integrated product resembles a sandwich configuration. The core material is not covered by the top layers, but instead flanked on each side by a sidewall. In some embodiments, the sidewalls are beveled, for example, top beveled. Sandwich construction can provide increased power transmission to the edge of the ski, and thus, greater flexibility. Half cap (hybrid or semi-cap) construction is a fusion of cap construction and sandwich construction. In this configuration, the top layer folds over the edges of the top half of the core material, including the sidewalls. The bottom half of the core material is uncovered but flanked on each side by a sidewall. Half cap construction provides the benefit of lightweight and adequate power transmission.

Skis and other similar sporting goods equipment can have various shapes, contours, and profiles that confer specific functional properties. For example, the width and/or height can vary along the length of the ski.

A method of lightweighting ski core compositions is to utilize high density foams prepared from materials, such as polystyrene, PU, and polyvinyl chloride (PVC). These materials can be manufactured in a variety of densities and are typically lighter and less dense compared to wood-based counterparts. Like wood, these materials can be laminated to create PU foam composite materials (PU composite lamellae). As such, high density foams can be used to lightweight ski cores while maintaining strength, durability, and flexural properties sufficient for their utility.

From a sustainability and greenhouse gas emissions perspective, however, these materials are not as sustainable as wood. A solution to this conundrum is the use of biobased raw materials in formulating these polymer materials such as PUs, for example. A PU foam described herein can comprise, be derived from, or be made from a biobased material, for example, from a microbe, plant, or seed. Skis and other sporting goods equipment described herein are produced from PU foam comprising, derived from, or made from microbial oils. For example, a PU foam described herein comprises, is derived from, or made from a microbial polyol, such as an algal polyol. In some embodiments, a composite material composed of a PU foam derived from microbial oils is used as the core material in a sporting goods equipment or component thereof.

In one aspect, a PU foam described herein has a biobased carbon content of 30% or more, 40% or more, 50% or more, 60% or more, 70% or more, 80% or more, or 90% or more, as determined by radiocarbon analysis, e.g., using ASTM D6866. For example, a PU foam described herein has a biobased carbon content of about 40%, about 41%, about 42%, about 43%, about 44%, about 45%, about 46%, about 47%, about 48%, about 49%, or about 50%.

In one aspect, the conglomerate waste stream resin described herein has a biobased carbon content of 30% or more, 40% or more, 50% or more, 60% or more, 70% or more, 80% or more, or 90% or more, as determined by radiocarbon analysis, e.g., using ASTM D6866. For example, a conglomerate resin described herein has a biobased carbon content of about 40%, about 41%, about 42%, about 43%, about 44%, about 45%, about 46%, about 47%, about 48%, about 49%, or about 50%.

While some examples described herein are directed to applications in ski construction, compositions described herein can also be used in the construction of other sporting goods equipment or components thereof, other articles such as sheet stock material used in furniture construction, or building materials, for example. Non-limiting examples of sporting goods equipment include, for example, a ski, an alpine ski, a touring ski, a cross country ski, an approach ski, a snowboard, a split board, a skateboard, a surfboard, a paddleboard, a wakeboard, a kiteboard, and a water ski.

The conglomerate resin material can be assembled in a mold. A mold can be heated, pressurized, or both. In some embodiments, a composite can be produced in a heated press at a temperature ranging from 50° C. to 100° C., from 50° C. to 60° C., from 60° C. to 70° C., from 70° C. to 80° C., from 80° C. to 90° C., or from 90° C. to 100° C., for example, at about 50° C., at about 60° C., at about 70° C., at about 80° C., at about 90° C., or at about 100° C.

In some embodiments, a conglomerate resin material can be produced in a pressurized mold ranging from about 20 psi to about 100 psi, from about 20 psi to about 30 psi, from about 30 psi to about 40 psi, from about 40 psi to about 50 psi, from about 50 psi to about 60 psi, from about 60 psi to about 70 psi, or from about 80 psi to about 100 psi, for example, at about 20 psi, at about 30 psi, at about 40 psi, at about 50 psi, at about 60 psi, at about 70 psi, at about 80 psi, at about 90 psi, or at about 100 psi.

In some embodiments, a conglomerate resin material can be produced by application of heat and/or pressure for duration of about 10 minutes, about 15 minutes, about 20 minutes, about 25 minutes, about 30 minutes, about 35 minutes, about 40 minutes, about 45 minutes, about 50 minutes, about 55 minutes, 60 minutes, about 65 minutes, about 70 minutes, about 75 minutes, about 80 minutes, 85 minutes, 90 minutes, or more.

A sporting goods equipment or a component thereof can be assembled in a mold. A mold can be heated, pressurized, or both. In some embodiments, a sporting goods equipment or component thereof can be produced in a heated press at a temperature ranging from 50° C. to 100° C., from 50° C. to 60° C., from 60° C. to 70° C., from 70° C. to 80° C., from 80° C. to 90° C., or from 90° C. to 100° C., for example, at about 50° C., at about 60° C., at about 70° C., at about 80° C., at about 90° C., or at about 100° C.

In some embodiments, a sporting goods equipment or component thereof can be produced in a pressurized mold ranging from about 20 psi to about 100 psi, from about 20 psi to about 30 psi, from about 30 psi to about 40 psi, from about 40 psi to about 50 psi, from about 50 psi to about 60 psi, from about 60 psi to about 70 psi, or from about 80 psi to about 100 psi, for example, at about 20 psi, at about 30 psi, at about 40 psi, at about 50 psi, at about 60 psi, at about 70 psi, at about 80 psi, at about 90 psi, or at about 100 psi.

In some embodiments, a sporting goods equipment or component thereof can be produced by application of heat and/or pressure for duration of about 10 minutes, about 15 minutes, about 20 minutes, about 25 minutes, about 30 minutes, about 35 minutes, about 40 minutes, about 45 minutes, about 50 minutes, about 55 minutes, 60 minutes, about 65 minutes, about 70 minutes, about 75 minutes, about 80 minutes, 85 minutes, 90 minutes, or more.

PU Foam Production

PU foams can be produced by reacting isocyanates and polyols in the presence of catalyst, heat, a linker or chain extender, and other additives. Additives can include surfactants (e.g., silicon surfactants), emulsifiers, stabilizers, property modifiers, performance additives, curatives, release agents, and coloring agents (e.g., color pastes). Additives can be used to achieve specific physical and functional properties of the PU, as well as improve processing, resin stability, cycle times, and overall yields. Physical properties of PU foams can be influenced by the addition of chemical additives during processing. These physical properties include density, strength, and flexural properties, which are critical factors for the application of these foams in consumer products.

Methylene diphenyl diisocyanate (MDI), polymeric methylene diphenyl diisocyanate (pMDI), toluene diisocyanate (TDI), hexamethylene diisocyanate (HDI), isophorone diisocyanate (IPDI), and methyl isocyanate (MIC) are common isocyanates used in the production of PUs. Additional non-limiting examples of isocyanates include Rubinate® 9225, Rubinate® 44, and Rubinate® M. Rubinate® 9225 is a uretonomine-modified pure MDI. Rubinate® 9225 is derived from pure MDI and has been adjusted with a moderate amount of 2,4' isomer to improve stability and maximize physical properties. Rubinate® 9225 can be used as a precursor for prepolymers. Rubinate® 44 is a pure (>98%) 4,4' MDI with a melting point of 38° C. and is solid at room temperature. Rubinate® M isocyanate is a standard polymeric MDI.

Catalysts used for polymerization of polyols and isocyanates to form PUs include, for example, tin catalysts, dibutyl tin dilaurate (DBTDL), dibutyltin diacetate (DBTDA), triethylenediamine (TEDA or Dabco®), dimethylcyclohexylamine (DMCHA), dimethylethanolamine (DMEA), and bis-(2-dimethylaminoethyl)ether (A-99), titanium(IV) isopropoxide, tin carboxylates, bismuth-based catalysts, bismuth carboxylates, zinc carboxylates, zirconium carboxylates, nickel carboxylates, metal carboxylates, and amine catalysts (e.g., JEFFCAT® catalysts (e.g., JEFFCAT® ZF-22)). Catalyst selection can depend on balancing three reactions: urethane (polyol+isocyanate, or gel) formation, urea (water+isocyanate, or "blow") formation, and the isocyanate trimerization reaction. In some embodiments, catalysts are not required for polymerization. For example, heat can be used to accelerate the polymerization reaction.

PU foam production requires a blowing agent (also known as pneumatogen), a substance that creates holes in the foam matrix, thereby providing cellular structure to the foam. Blowing agents can be added in a liquid form during the hardening stage of the foam resulting in the formation of gaseous products and byproducts. Non-limiting examples of chemical blowing agents include isocyanate, water, cyclopentane, pentane, methylformate, dimethoxymethane, azodicarbonamide, hydrazine, and other nitrogen-based materials, and sodium bicarbonate.

In one aspect, a PU foam described herein comprises a polyol, glycerol, a polyether polyol, a silicone based additive, a blowing agent, a PU catalyst, and an isocyanate.

In some embodiments, the polyol is a TAG-derived polyol. In some embodiments, the TAG-derived polyol is a biobased polyol, for example, a microbial polyol, an algal polyol, a plant polyol, or a seed polyol.

In some embodiments, the polyol is in an amount of about 20% to about 50% or about 20% to about 40% on a weight-by-weight (w/w) basis of the foam. For example, the algal polyol is in an amount of about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50% on a weight-by-weight basis of the foam.

In some embodiments, the glycerol is in an amount of about 1% to about 10% or about 4% to about 9% on a weight-by-weight basis of the foam. For example, the glycerol is in an amount of about 1%, about 1%, about 2%, about 3%, about 4%, about 5%, about 6%, about 7%, about 8%, about 9%, or about 10% on a weight-by-weight basis of the foam.

In some embodiments, the polyether polyol is in an amount of about 1% to about 10% or about 4% to about 5% on a weight-by-weight basis of the foam. For example, the polyether polyol is in an amount of about 1%, about 2%, about 3%, about 4%, about 5%, about 6%, about 7%, about 8%, about 9%, or about 10% on a weight-by-weight basis of the foam. In some embodiments, the foam does not contain a polyether polyol.

In some embodiments, the polyether polyol is an amine polyol, a sucrose polyol, a polypropylene glycol, or a glycerin polyol. In some embodiments, the polyether polyol is a JEFFOL® polyether polyol. Non-limiting examples of JEFFOL® polyether polyols include JEFFOL® PPG-1000 polyol, JEFFOL® PPG-2000 polyol, JEFFOL® PPG-2801 polyol, JEFFOL® PPG-3706 polyol, JEFFOL® FX31-167 polyol, JEFFOL® FX31-240 polyol, JEFFOL® G30-650 polyol, JEFFOL® G31-28 polyol, JEFFOL® G31-35 polyol, JEFFOL® G31-43 polyol, JEFFOL® A-630 polyol, JEFFOL® A-800 polyol, JEFFOL® AD-310 polyol, JEFFOL® AD-500 polyol, JEFFOL® R-350X polyol, JEFFOL® R-425X polyol, JEFFOL® R-470X polyol, JEFFOL® S-490 polyol, JEFFOL® SA-499 polyol, JEFFOL® SD-361 polyol, JEFFOL® SD-441 polyol, JEFFOL® SG-360 polyol, and JEFFOL® SG-522 polyol. In some embodiments, the polyether polyol is JEFFOL® G30-650 polyol.

In some embodiments, the silicone based additive is in an amount of about 0.1% to about 2% or 0.1% to about 1% on a weight-by-weight basis of the foam. For example, the silicone based additive is in an amount of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% on a weight-by-weight basis of the foam. In some embodiments, the foam does not contain a silicone based additive.

In some embodiments, the silicone based additive is a silicone based surfactant. In some embodiments, the silicone based additive is a TEGOSTAB® surfactant. In some embodiments, the silicone based additive is TEGOSTAB® B 8871.

In some embodiments, the blowing agent is in an amount of about 0.1% to about 2% or 0.1% to about 1% on a weight-by-weight basis of the foam. For example, the blowing agent is in an amount of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% on a weight-by-weight basis of the foam.

In some embodiments, the blowing agent is water.

In some embodiments, the PU catalyst is in an amount of about 0.1% to about 2% or 0.1% to about 1% on a weight-by-weight basis of the foam. For example, the PU catalyst is in an amount of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% on a weight-by-weight basis of the foam.

In some embodiments, the PU catalyst is a metal based catalyst or an amine based catalyst. In some embodiments, the metal catalyst is a bismuth-based catalyst. In some embodiments, the bismuth-based catalyst is BiCAT® 8840. In some embodiments, the amine catalyst is a tertiary amine catalyst. In some embodiments, the amine catalyst is Dabco® 33-LV. In some embodiments, the amine catalyst is JEFFCAT® ZF-20.

In some embodiments, the PU catalyst comprises a polyol resin blend (B-side component; all PU components except isocyanate) in an amount of about 20% to about 60% or about 30% to about 50% on a weight-by-weight basis of the foam. For example, the polyol resin blend is in an amount of about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% on a weight-by-weight basis of the foam.

In some embodiments, the PU catalyst comprises an isocyanate (A-side component) in an amount of about 40% to about 80% or about 50% to about 70% on a weight-by-weight basis of the foam. For example, the isocyanate is in an amount of about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80% on a weight-by-weight basis of the foam.

In some embodiments, the isocyanate is a diisocyanate. In some embodiments, the isocyanate is a pure MDI. In some embodiments, the isocyanate is a polymeric MDI. In some embodiments, the isocyanate is Rubinate® isocyanate. In some embodiments, the isocyanate is Rubinate® M.

In one aspect, a PU foam described herein comprises:
a) 20-50% (w/w) of a TAG-derived polyol;
b) 1-10% (w/w) glycerol;
c) 0-10% (w/w) of a polyether polyol;
d) 0-2% (w/w) of a silicone based additive;
e) 0.1-2% (w/w) of a blowing agent;
f) 0.1-2% (w/w) of a PU catalyst; and
g) 40-70% (w/w) of an isocyanate.

Polyol Production

Microbial oil produced by oleaginous microbes has numerous advantages, including, but not limited to, improved production efficiency and TAG compositions that can be enhanced for generating polyols. Namely, increasing the levels of unsaturation of TAG compositions can enhance control of the chemistry involved in the generation of polyols. These characteristics of microbial oil result in a greater yield of —OH functionality relative to other currently available oils with greater TAG heterogeneity (hence, lower purity) and/or diversity (e.g., oilseed or plant derived oils). Thus, polyols derived from a microbial oil can be preferable in generating polymers, including in instances where physical properties of a polymer can be compromised by molecular impurities, such as non-hydroxylated fatty acids, that may be present in oils comprising a more diverse and/or heterogeneous TAG profile.

Methods of producing triglyceride oils from oleaginous microbes may also have reduced carbon footprints than methods of producing oils from cultivation of oilseeds. This may be particularly true when the sugar used for the cultivation of these microbes is sourced from energy efficient sugar cane mills that significantly rely on power supplied from co-generation of sugarcane bagasse.

Polyols derived from a microbial oil may be particularly useful for producing PU materials. For example, microbial oils may comprise relatively low TAG diversity, low fatty acid diversity, and the majority of fatty acids present in the microbial oil may be unsaturated fatty acids. A higher ratio of unsaturated fatty acid to saturated fatty acid allows for increased chemical reactivity at the double bonds. Microbial oils having low TAG diversity and a high proportion of unsaturated fatty acids are especially desirable in production of PUs because hydroxylation of such a mixture yields a greater percentage of fatty acids that can participate in crosslinking reactions with isocyanates. Unlike unsaturated fatty acids, saturated fatty acids which do not contain carbon-carbon double bounds and cannot participate in crosslinking reactions with isocyanates. Thus, polyols generated from hydroxylation of unsaturated fatty acids from microbial oil may yield PU materials having superior properties.

In the process of producing natural oil polyols (NOPs) from natural sources (such as biobased materials), hydroxyl functionality can be introduced via a chemical conversion of the triglyceride oil. This conversion requires the presence of a double bond on the acyl moiety of the fatty acid, e.g., an olefinic group, which can be accomplished using several different chemistries including, for example:
i) Epoxidation in the presence of hydrogen peroxide and an acid catalyst, followed by ring opening with reagents, such as water, hydrogen, methanol, ethanol, or other polyols. Ring opening can be facilitated by reaction with an alcohol, including, for example, β-substituted alcohols. These chemistries result in secondary hydroxyl moieties, and are therefore less reactive, for example, with isocyanate or methyl esters.
ii) Ozonolysis by molecular oxygen results in the formation of ozonides, which upon further oxidation results in scission at the double bond and formation of di-acids, carboxylic acids, and upon reduction with hydrogen, formation of aldehydes. Ozonolysis and reduction of oleic acid, for example, produces azaleic acid, pelargonic acid, and pelargonaldehyde, respectively.
iii) Hydroformylation with synthesis gas (syngas), using rhodium or cobalt catalysts to form the aldehyde at the olefinic group, followed by reduction of the aldehyde to alcohol in the presence of hydrogen.

While typically carried out in organic solvent, processes that utilize aqueous systems can also improve the sustainability of these chemistries. Of the chemistries described above, only hydroformylation results in the preservation of fatty acid length and formation of primary —OH moieties. Furthermore, only olefinic fatty acids with a double bond that is converted into a site possessing hydroxyl functionality, either through epoxidation and ring opening, ozonolysis, or hydroformylation/reduction, can participate in subsequent downstream chemistries, i.e., reaction with an isocyanate moiety to form a urethane linkage or reaction with methyl esters to form polyesters. All other fatty acids, namely, fully saturated fatty acids that do not contain carbon-carbon double bonds, cannot participate in crosslinking reactions with isocyanates. Hence, saturated fatty acids will compromise the structural integrity and degrade performance of the polymer produced therefrom.

The complexity and physical properties of a triglyceride oil can be evaluated by the fatty acid profile, and the triacylglycerol (TAG) profile. The fatty acid profile is a measure of fatty acid composition. The fatty acid profile of a triglyceride oil can be determined by subjecting oils to transesterification to generate fatty acid methyl esters and subsequently quantitating fatty acid type by Gas Chromatography with Flame Ionization Detector (GC-FID).

Additionally, if the fatty acid profile can be modulated such that the concentration of a particular species of monounsaturated or polyunsaturated fatty acids can be significantly increased from the concentration in the native oil, there would be an overall decrease in the diversity of TAG species present in the resulting oil. The net effect is that a higher number of hydroxylated fatty acids and a higher proportion of all TAG species can participate in urethane chemistries. For example, in two cultivars of peanut oil, N-3101 and H4110, oleic acid content was increased from 46% to 80%, and total monounsaturated and polyunsaturated fatty acids was increased only subtly, from 77% to 84%, respectively. According to the TAG profile of the resulting oils derived from the two cultivars, approximately 95% of all TAG species are accounted for in just eight regioisomers in cultivar H4110 and 23 regioisomers in cultivar N-3101. Thus, triglycerides that are significantly enriched in a single species result in more homogeneous substrates for subsequent chemical manipulations and incorporation into materials.

Provided herein are methods for the conversion of oils into highly homogenous polyols via hydroformylation and hydrogenation, as well as epoxidation and ring opening. The molecular purity of these polyols can be advantageous for all types of PU applications, including, but not limited to, as coatings for textiles and surfaces, as adhesives in packaging, textile, and industrial applications, as well as in hard and soft foam and elastomeric applications.

Microbial Oils

Microbial oils described herein include novel triglycerides derived from a microbe. Microbial oils can be produced using oleaginous microbes.

Oleaginous microbes can refer to species of microbes having oil contents in excess of 20% on a dry cell weight basis. These microbes are uniquely suited for generating highly pure, biobased polyols with hydroxyl (—OH) functionality. Oleaginous microbes have also been proven extremely facile for genetic modification and improvement.

Indeed, these improvements can occur on time scales that are greatly accelerated relative to what can be achieved in higher plant oilseeds. Oleaginous microbes offer tremendous utility in generating large quantities of triglyceride oils in short periods of time. In as little as 48 hours, appreciable oil production of about 30-40% oil (dry cell weight) can be obtained, whereas typical production requires 120 hours or more to achieve 70-80% oil (dry cell weight).

Furthermore, because these microbes can be heterotrophically grown using simple sugars, the production of these triglyceride oils can be divorced from the traditional constraints imposed by geography, climate, and season that constrain triglyceride oil production from oilseed crops.

Recombinant DNA techniques can be used to engineer or modify oleaginous microbes to produce triglyceride oils having desired fatty acid profiles and regiospecific or stereospecific profiles. Fatty acid biosynthetic genes, including, for example, those encoding stearoyl-ACP desaturase, delta-12 fatty acid desaturase, acyl-ACP thioesterase, ketoacyl-ACP synthase, and lysophosphatidic acid acyltransferase can be manipulated to increase or decrease expression levels and thereby biosynthetic activity. These genetically engineered microbes can produce oils having enhanced oxidative, or thermal stability, rendering a sustainable feedstock source for various chemical processes. The fatty acid profile of the oils can be enriched in midchain profiles or the oil can be enriched in triglycerides having specific saturation or unsaturation contents. WO2010/063031, WO2010/120923, WO2012/061647, WO2012/106560, WO2013/082186, WO2013/158938, WO2014/176515, WO2015/051319, and Lin et al. (2013) *Bioengineered*, 4:292-304, and Shi and Zhao. (2017) *Front. Microbiol.*, 8: 2185 each discloses microbe genetic engineering techniques for oil production.

Among microalgae, several genera and species are particularly suitable for producing triglyceride oils that can be converted to polyols including, but not limited to, *Chlorella* sp., *Pseudochlorella* sp., *Prototheca* sp., *Arthrospira* sp., *Euglena* sp., *Nannochloropsis* sp., *Phaeodactylum* sp., *Chlamydomonas* sp., *Scenedesmus* sp., *Ostreococcus* sp., *Selenastrum* sp., *Haematococcus* sp., *Nitzschia*, *Dunaliella*, *Navicula* sp., *Pseudotrebouxia* sp., *Heterochlorella* sp., *Trebouxia* sp., *Vavicula* sp., *Bracteococcus* sp., *Gomphonema* sp., *Watanabea* sp., *Botryococcus* sp., *Tetraselmis* sp., and *Isochrysis* sp.

In some embodiments, the microalgae is *Prototheca* sp. In some embodiments, the microalgae is *P. moriformis*. In some embodiments, the microalgae is *P. wickerhamii*. In some embodiments, a cell provided herein is derived from a UTEX 1435 base strain. In some embodiments, a cell provided herein is derived from a UTEX 1533 base strain.

Among oleaginous yeasts, several genera are particularly suitable for producing triglyceride oils that can be converted to polyols including, but not limited to, *Candida* sp., *Cryptococcus* sp., *Debaromyces* sp., *Endomycopsis* sp., *Geotrichum* sp., *Hyphopichia* sp., *Lipomyces* sp., *Pichia* sp., *Rodosporidium* sp., *Rhodotorula* sp., *Sporobolomyces* sp., *Starmerella* sp., *Torulaspora* sp., *Trichosporon* sp., *Wickerhamomyces* sp., *Yarrowia* sp., and *Zygoascus* sp.

Among oleaginous bacteria, there are several genera and species which are particularly suited to producing triglyceride oils that can be converted to polyols including, but not limited to *Flavimonas oryzihabitans*, *Pseudomonas aeruginosa*, *Morococcus* sp., *Rhodobacter sphaeroides*, *Rhodococcus opacus*, *Rhodococcus erythropolis*, *Streptomyces jeddahensis*, *Ochrobactrum* sp., *Arthrobacter* sp., *Nocardia* sp., *Mycobacteria* sp., *Gordonia* sp., *Catenisphaera* sp., and *Dietzia* sp.

Growth of Oleaginous Microbes and Extraction of Microbial Oil

Oleaginous microbes may be cultivated in a bioreactor or fermenter. For example, heterotrophic oleaginous microbes can be cultivated on a sugar-containing nutrient broth.

Oleaginous microbes produce microbial oil, which comprises triacylglycerides or triacylglycerols and may be stored in storage bodies of the cell. A raw oil may be obtained from microbes by disrupting the cells and isolating the oil. WO2008/151149, WO2010/06032, WO2011/150410, WO2012/061647, and WO2012/106560 each discloses heterotrophic cultivation and oil isolation techniques. For example, microbial oil may be obtained by providing or cultivating, drying and pressing the cells. Microbial oils produced may be refined, bleached, and deodorized (RBD) as described in WO2010/120939, which is entirely incorporated herein by reference. Microbial oils can be obtained without further enrichment of one or more fatty acids or triglycerides with respect to other fatty acids or triglycerides in the raw oil composition.

Microbial Oil Content

A microbial oil may be characterized by its triacylglycerol ("TAG") profile. A TAG profile indicates relative amounts of various TAGs, and consequently fatty acids (each TAG molecule is a tri-ester of glycerol and three fatty acids), present in microbial oil. As disclosed herein, fatty acids from microbial oils having TAG profiles comprising high levels of unsaturated fatty acids and/or having low TAG diversity may be hydroformylated and hydrogenated to produce hydroformylated polyols.

A microbial oil may have a TAG profile comprising a high proportion of one or more unsaturated fatty acids relative to other fatty acids in the microbial oil. A microbial oil may have a TAG profile comprising 60% or more of one or more unsaturated fatty acids on a weight-by-weight basis. The one or more unsaturated fatty acids may comprise C18:1, such as oleic acid.

A microbial oil may have a TAG profile comprising a high proportion of one or more unsaturated fatty acids relative to one or more saturated fatty acids in the microbial oil. A microbial oil may have a TAG profile comprising low TAG diversity, e.g., fewer TAG species than in, for example, an oilseed oil. Microbial oils rich in a TAG or fatty acid may comprise fewer, different TAG species, or lesser amounts of different TAG species.

Oils derived from microorganisms having TAG profiles with high purity/high homogeneity/low diversity and high unsaturated fatty acid content are particularly advantageous for use in PU production. Highly pure oils improve product yield and reduce the likelihood of contaminants that adversely affect the physical properties of the resulting PU. Highly unsaturated oils allow for increased numbers of primary alcohol groups formed during hydroformylation and hydrogenation, thereby increasing the functionality, reactivity, and crosslinking during subsequent polymerization reactions. The quantity and type of crosslinking can influence the stability, durability, and rigidity of the resulting polymer.

In some embodiments, the microbial oil comprises up to nine, up to eight, up to seven, up to six, up to five, up to four, up to three, up to two, or one TAG species present in amounts of 1% or more of the total TAG species.

In some embodiments, the microbial oil comprises one TAG species present in amounts of about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more of the total TAG species on a weight-by-weight basis.

In some embodiments, the microbial oil comprises two TAG species collectively present in amounts of about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more of the total TAG species on a weight-by-weight basis.

In some embodiments, the microbial oil comprises three TAG species collectively present in amounts of about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more of the total TAG species on a weight-by-weight basis.

Non-limiting examples of TAG species include OOO, LLL, LnLnLn, LLP, LPL, LnLnP, LnPLn, and any regioisomer thereof, where each O is olein, each L is linolein, each Ln is linolenin, and each P is palmitin. In some embodiments, the predominant TAG species in the microbial oil is OOO, LLL, LnLnLn, LLP, LPL, LnLnP, LnPLn, or any regioisomer thereof.

In some embodiments, the predominant TAG species in the microbial oil is OOO or triolein. In some embodiments, the microbial oil comprises at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, or at least about 99% of triolein on a weight-by-weight basis.

In some embodiments, the fatty acid profile of the microbial oil comprises at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of any one or combination of unsaturated fatty acid species on a weight-by-weight basis.

Non-limiting examples of unsaturated fatty acid species include of a C16:1 fatty acid, a C16:2 fatty acid, a C16:3 fatty acid, a C18:1 fatty acid, a C18:2 fatty acid, a C18:3 fatty acid, a C18:4 fatty acid, a C20:1 fatty acid, a C20:2 fatty acid, a C20:3 fatty acid, a C22:1 fatty acid, a C22:2 fatty acid, a C22:3 fatty acid, a C24:1 fatty acid, a C24:2 fatty acid, and a C24:3 fatty acid.

In some embodiments, the fatty acid profile of an oil described herein comprises up to about 1%, up to about 2%, up to about 3%, up to about 4%, up to about 5%, up to about 6%, up to about 7%, up to about 8%, up to about 9%, up to about 10%, up to about 11%, least about 12%, up to about 13%, up to about 14%, up to about 15%, up to about 16%, up to about 17%, up to about 18%, up to about 19%, up to about 20%, up to about 21%, up to about 22%, up to about 23%, up to about 24%, up to about 25%, up to about 26%, up to about 27%, up to about 28%, up to about 29%, up to about 30%, up to about 31%, up to about 32%, up to about 33%, up to about 34%, or up to about 35% of any one or combination of saturated fatty acid species on a weight-by-weight basis. Non-limiting examples of saturated fatty acid species include a C16:0 fatty acid, a C18:0 fatty acid, a C20:0 fatty acid, a C22:0 fatty acid, a C22:0 fatty acid, or a C24:0 fatty acid.

In some embodiments, the fatty acid profile of an oil described herein comprises about 60%, about 61%, about 62%, about 63%, about 64%, about 65%, about 66%, about 67%, about 68%, about 69%, about 70%, least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of any one or combination of unsaturated fatty acid species on a weight-by-weight basis. Non-limiting examples of unsaturated fatty acid species include a C16:1 fatty acid, a C16:2 fatty acid, a C16:3 fatty acid, a C18:1 fatty acid, a C18:2 fatty acid, a C18:3 fatty acid, a C18:4 fatty acid, a C20:1 fatty acid, a C20:2 fatty acid, a C20:3 fatty acid, a C22:1 fatty acid, a C22:2 fatty acid, a C22:3 fatty acid, a C24:1 fatty acid, a C24:2 fatty acid, and a C24:3 fatty acid.

In some embodiments, the fatty acid profile of an oil described herein comprises at least about 60%, at least about 61%, at least about 62%, at least about 63%, at least about 64%, at least about 65%, at least about 66%, at least about 67%, at least about 68%, at least about 69%, at least about 70%, least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of any one or combination of unsaturated fatty acid species on a weight-by-weight basis.

In some embodiments, the fatty acid profile of an oil described herein comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of any one or combination of unsaturated fatty acid species on a weight-by-weight basis.

Non-limiting examples of unsaturated fatty acid species include those listed in TABLE 1.

TABLE 1

| Monounsaturated FA | Lipid Number | Polyunsaturated FA | Lipid Number |
| --- | --- | --- | --- |
| Myristoleic acid | C14:1 | Hexadecatrienoic acid (HTA) | C16:3 |
| Palmitoleic acid | C16:1 | Linoleic acid | C18:2 |
| Sapienic acid | C16:1 | Linolelaidic acid | C18:2 |
| Oleic acid | C18:1 | α-Linolenic acid | C18:3 |
| Elaidic acid | C18:1 | Pinolenic acid | C18:3 |
| Vaccenic acid | C18:1 | Stearidonic acid | C18:4 |
| Petroselinic acid | C18:1 | Eicosadienoic acid | C20:2 |
| Eicosenoic (Gondoic) acid | C20:1 | Mead acid | C20:3 |
| Paullinic acid | C20:1 | Eicosatrienoic acid (ETE) | C20:3 |
| Gadoleic acid | C20:1 | Dihomo-γ-linolenic acid (DGLA) | C20:3 |
| Erucic acid | C22:1 | Podocarpic acid | C20:3 |
| Brassidic acid | C22:1 | Arachidonic acid (AA) | C20:4 |
| Nervonic acid | C24:1 | Eicosatetraenoic acid (ETA) | C20:4 |
| | | Eicosapentaenoic acid (EPA) | C20:5 |
| | | Heneicosapentaenoic acid (HPA) | C21:5 |
| | | Docosadienoic acid | C22:2 |
| | | Adrenic acid (AdA) | C22:4 |
| | | Docosapentaenoic acid (Osbond acid) | C22:5 |
| | | Docosahexaenoic acid (DPA) | C22:5 |
| | | Docosahexaenoic acid (DHA) | C22:6 |
| | | Tetracosatetraenoic acid | C24:4 |
| | | Tetracosapentaenoic acid | C24:5 |

In some embodiments, the fatty acid profile of a microbial oil described herein comprises at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of a C18:1 fatty acid on a weight-by-weight basis.

In some embodiments, the fatty acid profile of a microbial oil described herein comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of a C18:1 fatty acid on a weight-by-weight basis.

In some embodiments, the fatty acid profile of a microbial oil described herein at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of oleic acid on a weight-by-weight basis.

In some embodiments, the fatty acid profile of a microbial oil described herein comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of oleic acid or oleate.

In some embodiments, the fatty acid profile a microbial oil described herein comprises up to about 1%, up to about 2%, up to about 3%, up to about 4%, up to about 5%, up to about 6%, up to about 7%, up to about 8%, up to about 9%, up to about 10%, up to about 11%, least about 12%, up to about 13%, up to about 14%, up to about 15%, up to about 16%, up to about 17%, up to about 18%, up to about 19%, up to about 20%, up to about 21%, up to about 22%, up to about 23%, up to about 24%, up to about 25%, up to about 26%, up to about 27%, up to about 28%, up to about 29%, up to about 30%, up to about 31%, up to about 32%, up to about 33%, up to about 34%, or up to about 35% of any one or combination of saturated fatty acid species selected from the group consisting of a C16:0 fatty acid, a C18:0 fatty acid, a C20:0 fatty acid, a C22:0 fatty acid, and a C24:0 fatty acid.

In some embodiments, a microbial oil comprises 60% or more of a C18:1 fatty acid and 30% or less of one or more saturated fatty acids. In some embodiments, the microbial oil comprises at least 85% oleate and up to 5% linoleate.

In some embodiments, a microbial oil comprises 60% or more of a C18:1 fatty acid, 30% or less of one or more saturated fatty acids, and at least one unsaturated fatty acid in a remainder. In some embodiments, the microbial oil comprises at least 85% oleate, up to 5% linoleate, and up to 1.8% palmitate.

In some embodiments, a microbial oil comprises at least 60% of a C18:1 fatty acid and up to 15% of one or more other unsaturated fatty acids selected from the group consisting of: a C16:1 fatty acid, a C18:2 fatty acid, a C18:3 fatty acid, and any combination thereof.

In some embodiments, a microbial oil comprises at least 60% of a C18:1 fatty acid, up to 10% of a C18:2 fatty acid, and up to 20% of a C16:0 fatty acid.

In some embodiments, a microbial oil comprises at least 70% of a C18:1 fatty acid, up to 8% of a C18:2 fatty acid, and up to 12% of a C16:0 fatty acid.

In some embodiments, a microbial oil comprises at least 80% of a C18:1 fatty acid, up to 8% of a C18:2 fatty acid, and up to 5% of a C16:0 fatty acid.

In some embodiments, a microbial oil has an iodine value of 88 g $I_2$/100 g.

EXAMPLES

Example 1. Production of Recycled Sheet Material

In this example, flashing and other waste materials from ski manufacturing, were mixed with an epoxy and a hardener, cast into a mold, and heated to cure the epoxy resin. TABLE 2 shows three example waste stream compositions. Once cured, the resulting material can be machined to a desired length, width, or thickness. A mold of dimensions 99.06 cm (L)×35.56 cm (W)×0.9525 cm, with a volume of 4473.67 mL was utilized and preheated to a temperature of 85° C. During this time, a mold release (such as Mavcoat® KP or 527 ML) was applied to the inner surface of the mold to ensure the part releases the cast without damage. In a 1-gallon bucket, dry raw materials were added as outlined in TABLE 3. Epoxy (Entropy Resin, A-side ER-305-D) and hardener (B-side hardener, XH19-222-087A) were slowly added to the bucket with constant stirring using a paddle mixer to incorporate flashings. Additional examples of epoxy/hardener combinations include, for example, Entropy resins ER1001-6/EH2001-7 and ER300-6/EH2001-7 and Sicomin GreenPoxy 33/SZ8525. For example, epoxy-to-hardener ratios of 100:35, 100:35, and 100:24, respectively, can be used. After the material was thoroughly mixed, the bucket contents were added to the mold and a cover was placed on top. The mold was then heated in a press such that the temperature was maintained at 85° C., followed by the application of pressure of about 65 psi (120 psig) for 30-60 minutes. At the conclusion of the heating step, the resulting composite was demolded, sanded, and planed and routed to the desired final dimensions.

Figure 5:
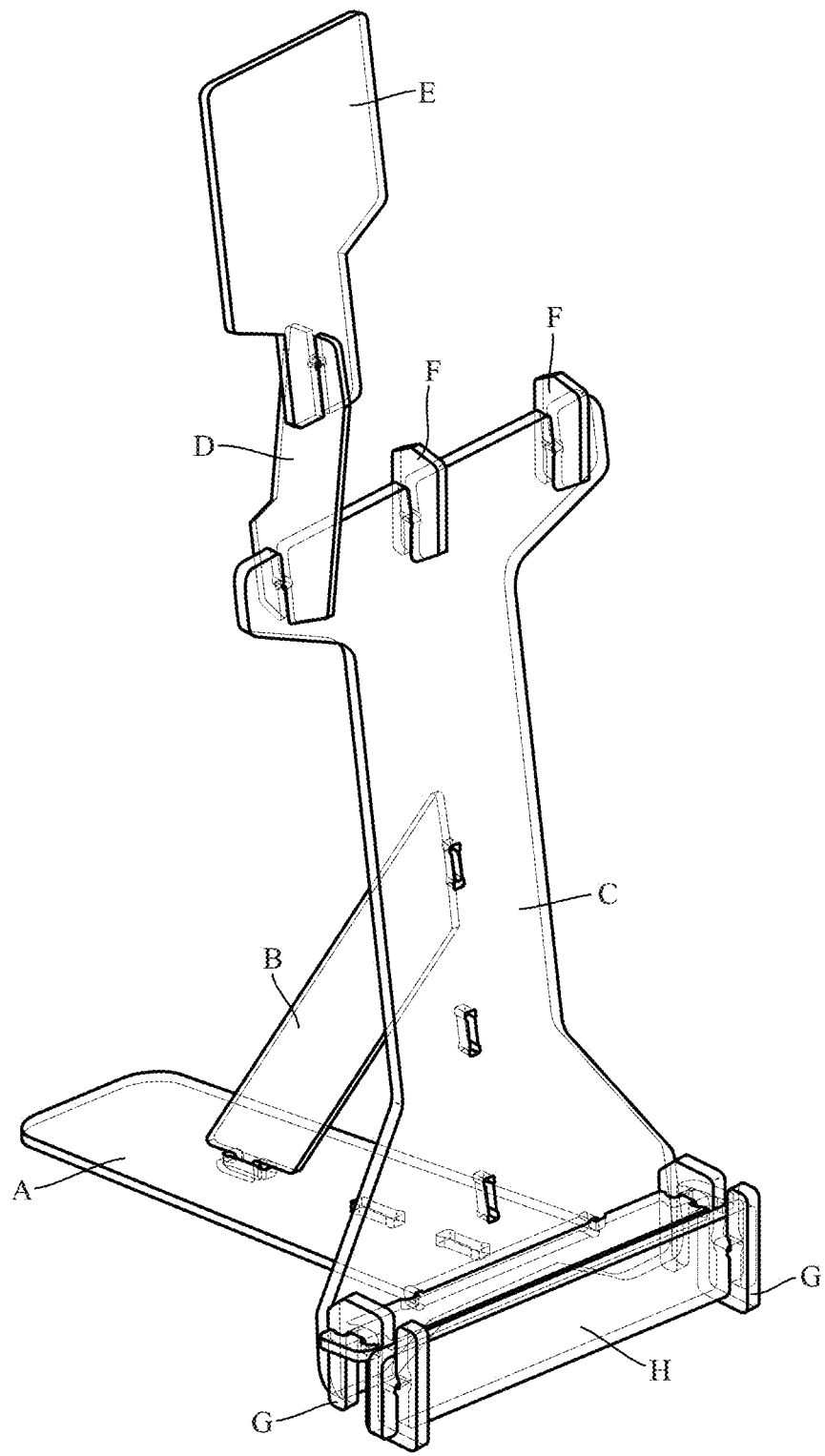
FIG. 5 illustrates a fully assembled kiosk structure composed of the various parts illustrated in FIG. 4, Panels A-H.

Such material can be used to construct a variety of implements, structures, or devices. For example, FIG. 4, Panels A-H illustrate various parts machined from such sheet material used in the assembly of a fully articulating kiosk structure, e.g., a ski stand (FIG. 5). Assembly of the kiosk structure requires no glue or fasteners for the display of ski, split, or snowboards for example. FIG. 4, Panel A includes slits A-1, A-2, and A-3 for coupling with FIG. 4, Panel B. FIG. 4, Panel C includes slits C-1, C-2, and C-3 also for coupling with FIG. 4, Panel B. All dimensions shown are in mm.

TABLE 2

Waste Stream Compositions

| Material | Composition 1 | | Composition 2 | | Composition 3 | |
|---|---|---|---|---|---|---|
| | Mass (g) | Percent Composition | Mass (g) | Percent Composition | Mass (g) | Percent Composition |
| Fiberglass | 611.7 | 36.63 | — | — | — | — |
| Epoxy/Hardener | 409 | 24.49 | — | — | — | — |
| Nylon (TS) | 200.1 | 11.98 | — | — | — | — |
| Wood | 265 | 15.87 | 265 | 58.99 | — | — |
| PU Foam | 22.4 | 1.34 | 22.4 | 4.99 | — | — |
| PU Cast | 161.82 | 9.69 | 161.8 | 36.02 | 500.0 | 100% |

TABLE 3

| Material | Weight % | Weight (g) |
|---|---|---|
| Epoxy/hardener | 50% | 2000 |
| Flashing (ground ski material) | 25% | 1000 |
| Flashing (router shavings - polyurethane) | 25% | 1000 |

Example 2. Production of Recycled Sheet Material for Use in a Ski Boot Plate In this example, recycled materials were incorporated into other materials found in skis to make a boot plate. The boot plate was 56 cm in length, 5 mm deep, and 16 mm wide. An aluminum mold, of the internal dimensions shown in FIG. 2 with a lid, was treated with a suitable mold release (such as Mavcoat® KP or 527 ML) applied to the inner surface of the mold to ensure the part releases the cast without damage. In a 1-gallon bucket, dry raw materials were added as outlined in TABLE 3. Epoxy and hardener (Entropy Resin, A-side ER-305-D, and B-side hardener, XH19-222-087A) were slowly added to the bucket with constant stirring using a paddle mixer to incorporate flashings. Additional epoxy-hardener combinations include, for example, Entropy resins ER1001-6/EH2001-7 and ER300-6/EH2001-7 and Sicomin GreenPoxy33/SZ8525. For example, epoxy to hardener ratios of 100:35, 100:35, and 100:24, respectively. After the material was thoroughly mixed, the bucket contents were added to the mold and a cover was placed on top. The mold was then heated in a suitable press such that the temperature was maintained at 85° C., followed by the application of pressure of about 65 psi (120 psig) for 30-60 minutes. At the conclusion of the heating step, the resulting composite was de-molded and the edges sanded to remove any imperfections.

Figure 3:
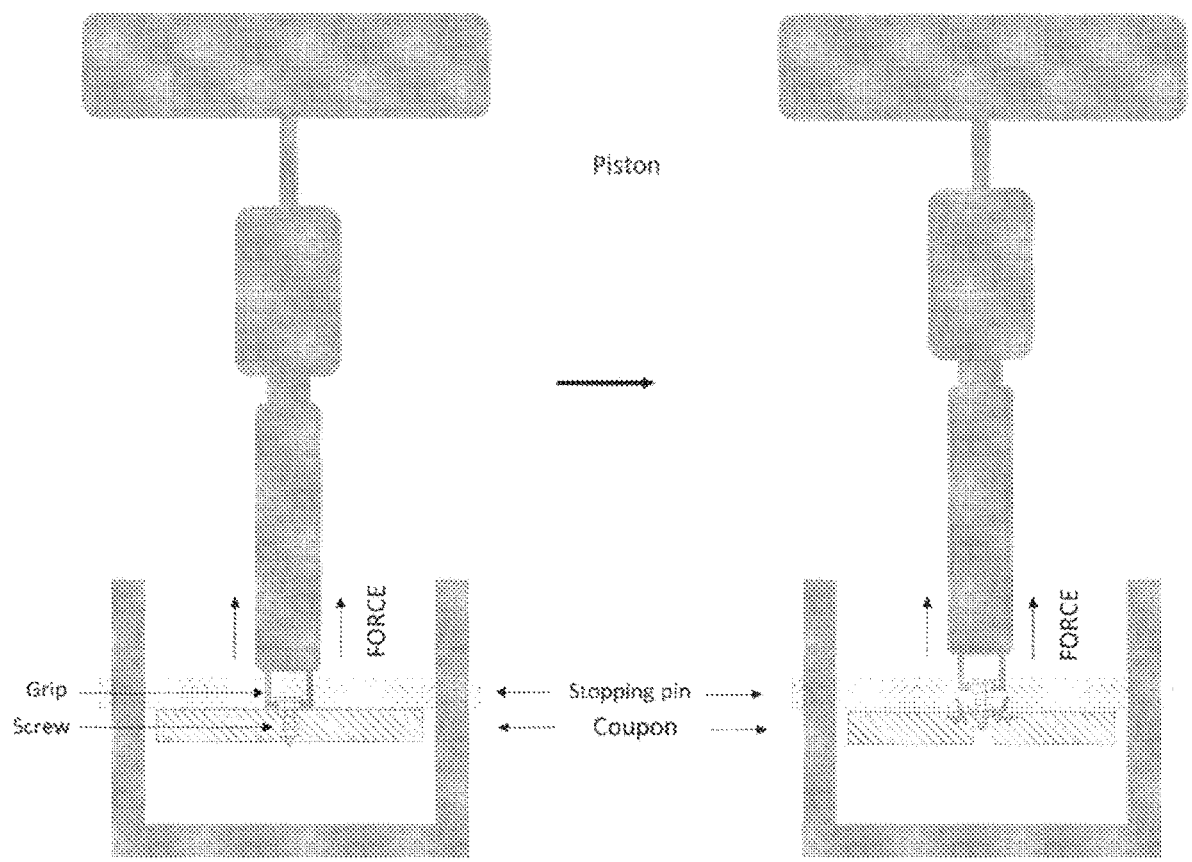
FIG. 3 depicts a testing apparatus used to assess the efficacy of a boot plate material.
Figure 4A:
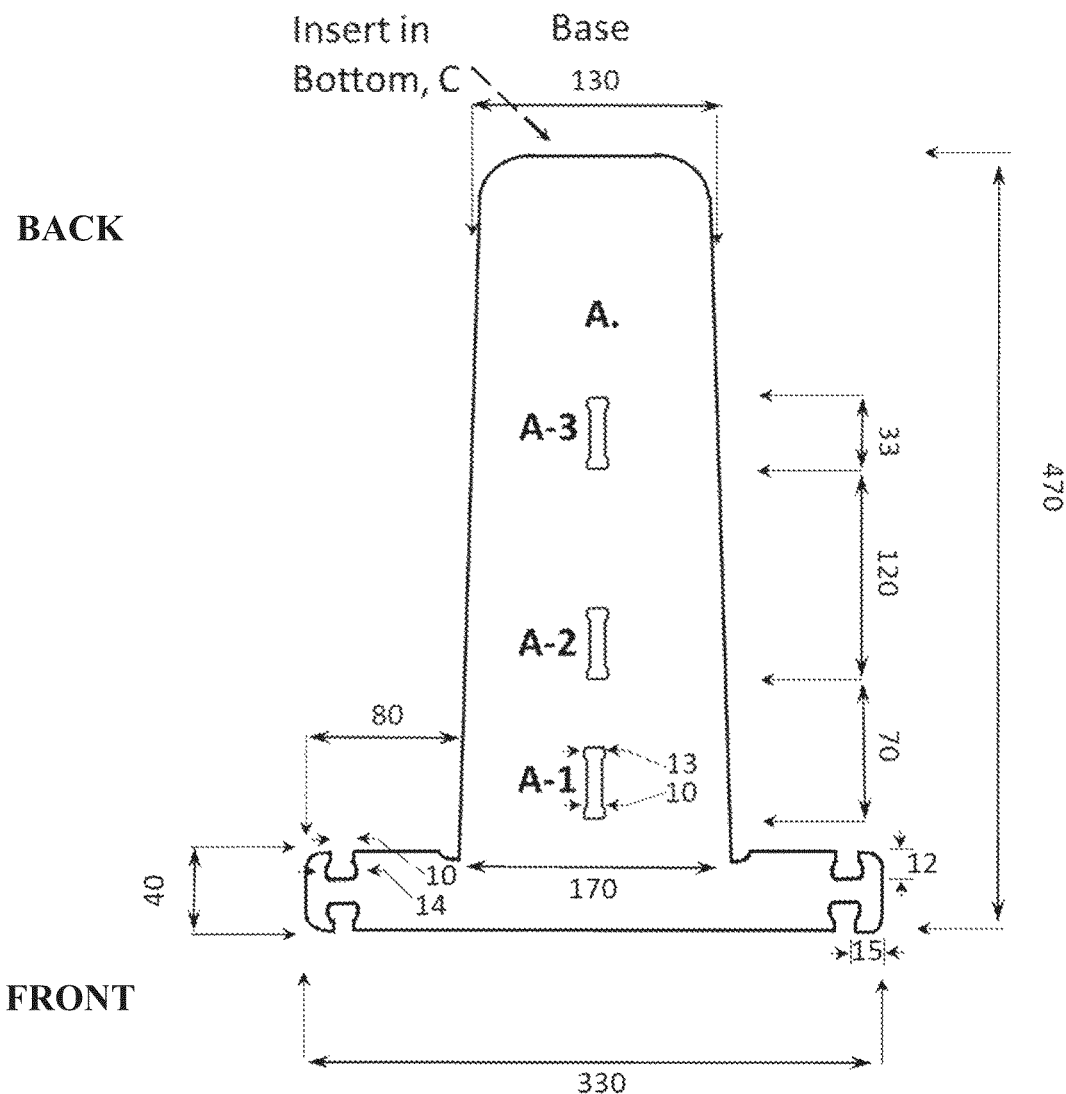
FIG. 4, Panels A-H illustrate various parts of an example kiosk structure produced from a recycled sheet material described herein.
Figure 4B:
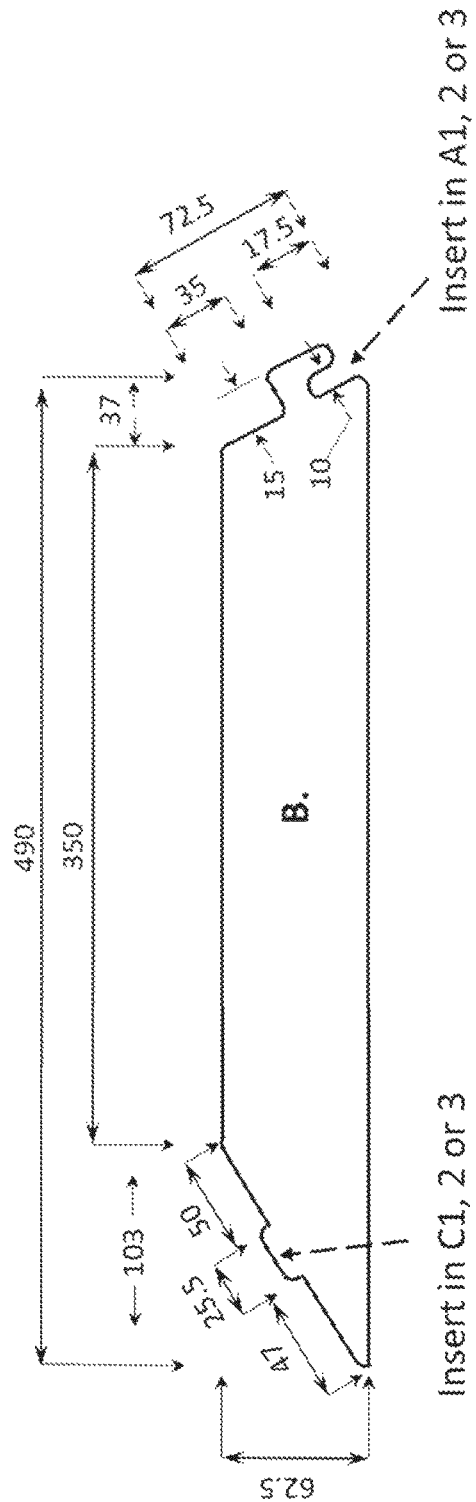
Figure 4C:
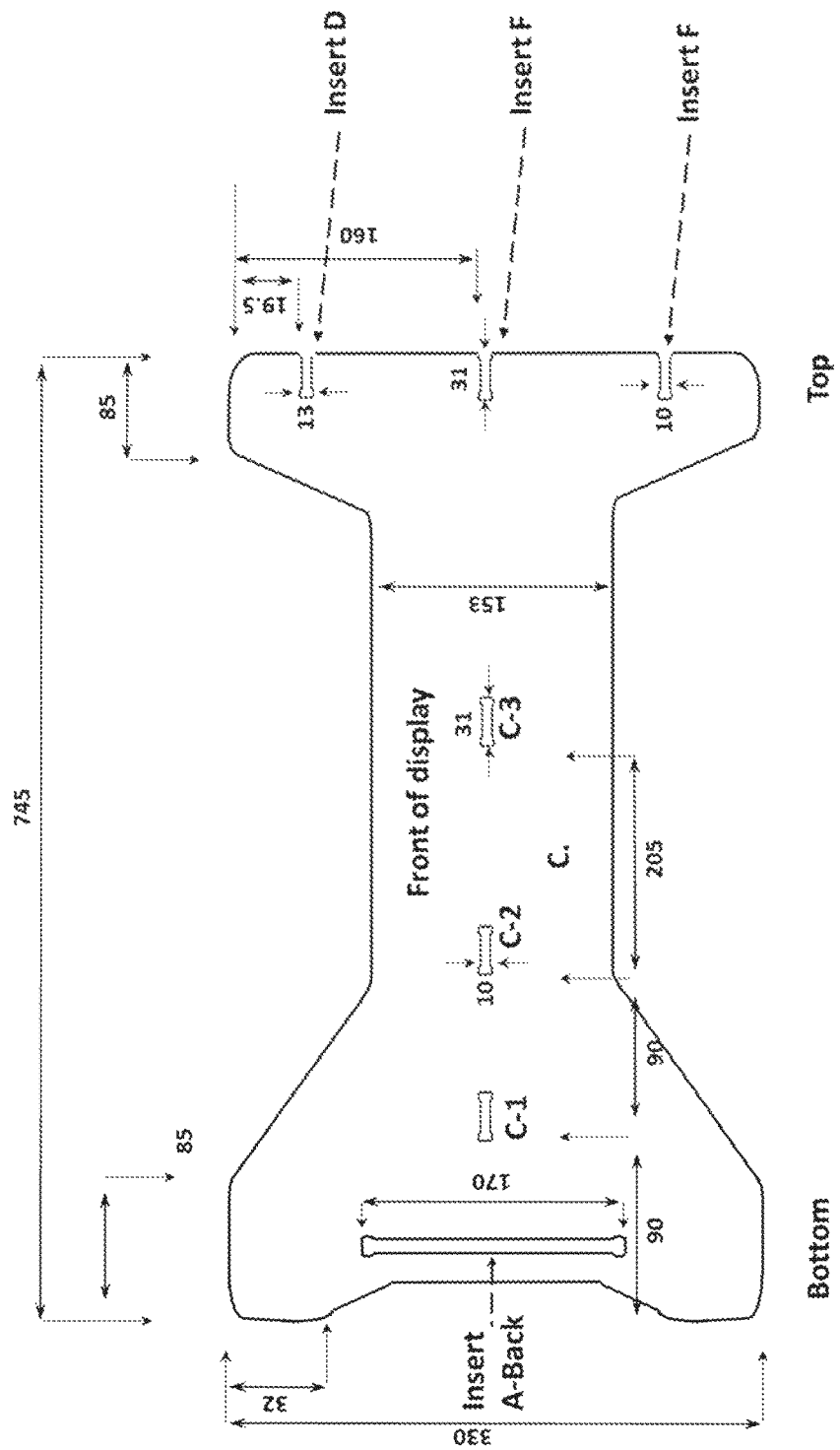
Figures 4D, 4E:
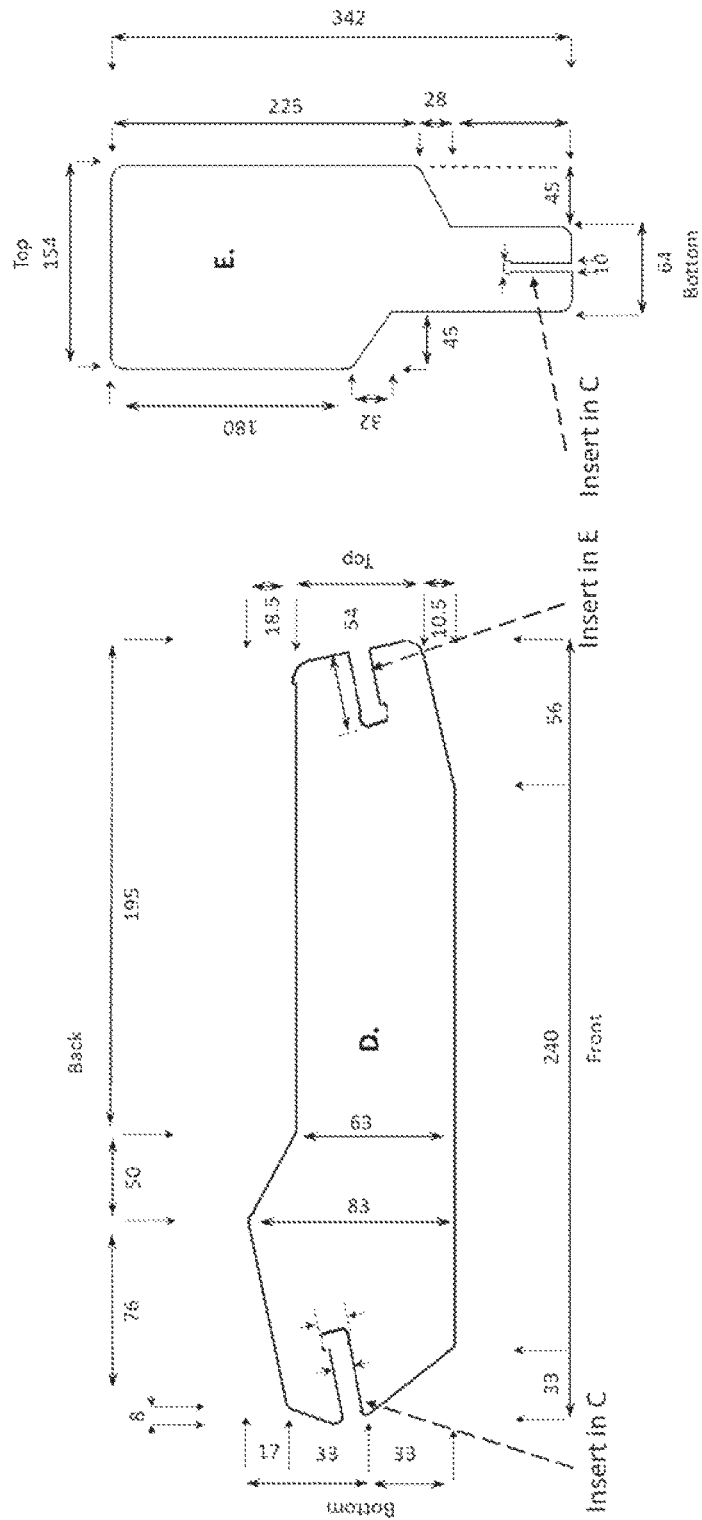
Figure 4F:
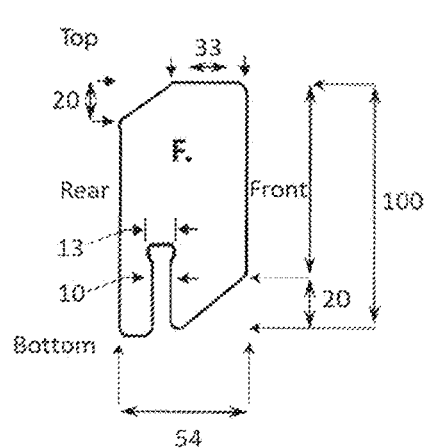
Figure 4G:
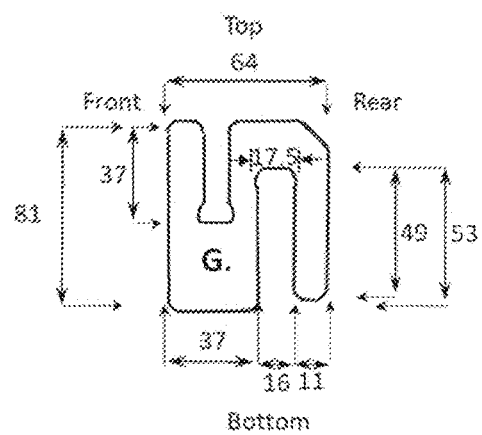
Figure 4H:
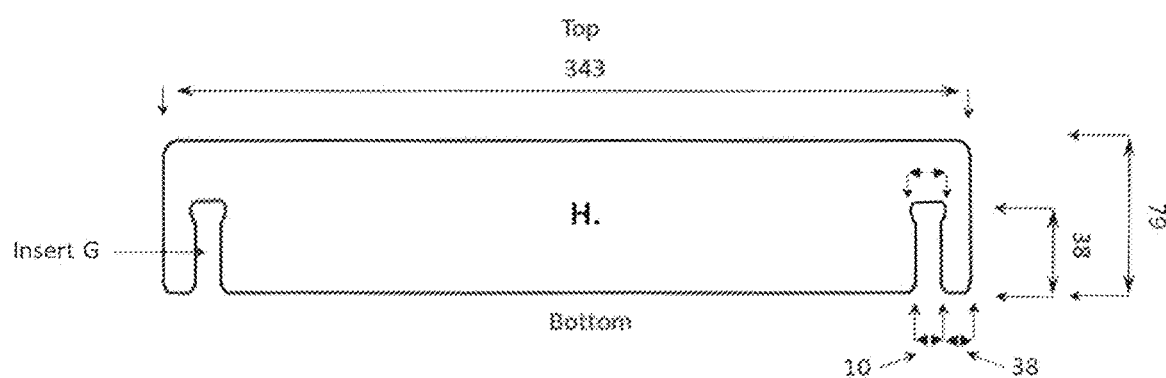

The resulting boot plate was tested in a Screw Pull-out Test to compare the suitability of materials for serving as a boot plate insert. The testing apparatus, an Instron Model 1000, was used to assess the efficacy of a boot plate material as shown in FIG. 3. The grip of the Instron was positioned just beneath the head of the screw which was threaded into the boot plate material to a pre-determined depth of 7.5 mm. The Instron piston was adjusted such that the coupon was pulled to just contact the stopping pin in the test apparatus. At this point, the piston was retracted in a continuous motion at a rate of 20 in/min. The screw, held in place by the grip and the coupon, was prevented from advancing by the stopping pin, and was subjected to increasing force (measured in ft-lbs) as the piston pulls on the screw head. The failure point of the material is when the screw loses purchase on the boot plate and force applied by the instrument returns to zero. The efficacy of the boot plate can be assessed by the maximum force required for screw failure. TABLE 4 shows the results of pull-out tests run with the boot plate fabricated as described above as compared with results obtained with a boot plate fabricated with maple hardwood. The force required for screw failure was significantly greater for the boot plate fabricated with flashing materials versus the boot plate fabricated with maple.

TABLE 4

| Material | Average force at failure (ft-lbs) | StDEV | % CV |
|---|---|---|---|
| Maple Hardwood | 283.6 | 69.3 | 24.5 |
| Flashing (ground ski material) | 433.5 | 30.23 | 7.0 |

EMBODIMENTS

In one aspect, provided herein is a conglomerate resin, comprising:
a) a waste stream material, wherein the waste stream material comprises a polyurethane, wherein the waste stream material is from about 50% to about 90% weight-by-weight (w/w) of the conglomerate resin;
b) an epoxy resin, wherein the epoxy resin is from about 1% to about 25% w/w of the conglomerate resin; and
c) a hardener, wherein the hardener is from about 1% to about 25% w/w of the conglomerate resin.

In some embodiments, the waste stream material is about 50%, about 60%, about 70%, about 80%, or about 90% w/w of the conglomerate resin.

In some embodiments, the epoxy resin is about 1%, about 2%, about 3%, about 4%, about 5%, about 6%, about 7%, about 8%, about 9%, about 10%, about 15%, about 20%, or about 25% w/w of the conglomerate resin.

In some embodiments, the hardener is about 1%, about 2%, about 3%, about 4%, about 5%, about 6%, about 7%, about 8%, about 9%, about 10%, about 15%, about 20%, or about 25% w/w of the conglomerate resin.

In some embodiments, a w/w ratio of the waste stream material and the epoxy resin plus the hardener is about 1 to about 1. In some embodiments, a w/w ratio of the epoxy resin and the hardener is about 100 to about 35. In some embodiments, a w/w ratio of the epoxy resin and the hardener is about 100 to about 25.

In some embodiments, the waste stream material comprises the polyurethane at an amount of from about 10% to about 100% w/w of the waste stream material. In some embodiments, the waste stream material comprises the polyurethane at an amount of from about 1% to about 2% w/w of the waste stream material. In some embodiments, the waste stream material comprises the polyurethane at an amount of from about 1% to about 5% w/w of the waste stream material. In some embodiments, the waste stream material comprises the polyurethane at an amount of from about 1% to about 10% w/w of the waste stream material. In some embodiments, the waste stream material comprises the polyurethane at an amount of from about 30% to about 40% w/w of the waste stream material. In some embodiments, the waste stream material comprises the polyurethane at an amount of from about 90% about 100% w/w of the waste stream material.

In some embodiments, the polyurethane comprises a cast polyurethane.

In some embodiments, the polyurethane comprises a polyurethane foam.

In some embodiments, the polyurethane has a biobased content of at least 40%. In some embodiments, the polyurethane has a biobased content of at least 50%. In some embodiments, the polyurethane has a biobased content of from about 40% to about 90%. For example, a polyurethane has a biobased content of about 50%, about 60%, about 70%, about 80%, or about 90%. In some embodiments, the polyurethane has a biobased content of from about 50% to about 60%. For example, a polyurethane provided herein can have a biobased content of at least 50%, at least 51%, at least 52%, at least 53%, at least 54%, at least 55%, at least 56%, at least 57%, at least 58%, at least 59%, or at least 60%. Biobased content of a polyurethane can be determined by ASTM D6866.

In some embodiments, the polyurethane is formulated with a biobased polyol. In some embodiments, the biobased polyol is derived from a microbial oil. In some embodiments, the biobased polyol is derived from an algal oil.

In some embodiments, the biobased polyol has a C18:1 content of at least 60%. In some embodiments, the biobased polyol has a C18:1 content of at least 70%. In some embodiments, the biobased polyol has a C18:1 content of at least 80%. In some embodiments, the biobased polyol has a C18:1 content of at least 90%. Biobased content of a polyol can be determined by ASTM D6866.

In some embodiments, the waste stream material further comprises one or more species of wood at an amount of from about 1% to about 60% w/w of the waste stream material. In some embodiments, the waste stream material further comprises one or more species of wood at an amount of from about 10% to about 20% w/w, from about 20% to about 30% w/w, from about 30% to about 40% w/w, from about 40% to about 50% w/w, or from about 50% to about 60% w/w of the waste stream material. In some embodiments, the waste stream material further comprises one or more species of wood at an amount of from about 50% to about 60% w/w of the waste stream material.

In some embodiments, the waste stream material further comprises recycled or post manufacturing waste fiberglass at an amount of from about 1% to about 40% w/w of the waste stream material. In some embodiments, the waste stream material further comprises recycled or post manufacturing waste fiberglass at an amount of from about 30% to about 40% w/w of the waste stream material.

In some embodiments, the waste stream material further comprises a recycled, cured epoxy resin at an amount of from about 1% to about 30% w/w of the waste stream material. In some embodiments, the waste stream material further comprises a recycled, cured epoxy resin at an amount of from about 20% to about 30% w/w of the waste stream material.

In some embodiments, the waste stream material further comprises recycled or post manufacturing waste nylon at an amount of from about 1% to about 20% w/w of the waste stream material. In some embodiments, the waste stream material further comprises recycled or post manufacturing waste nylon at an amount of from about 10% to about 20% w/w of the waste stream material.

In some embodiments, the waste stream material further comprises a plastic or thermoplastic material at an amount of from about 1% to about 50% w/w of the waste stream material. In some embodiments, the waste stream material further comprises a plastic or thermoplastic material at an amount of from about 1% to about 40% w/w of the waste stream material. In some embodiments, the waste stream material further comprises a plastic or thermoplastic material at an amount of from about 1% to about 30% w/w of the waste stream material. In some embodiments, the waste stream material further comprises a plastic or thermoplastic material at an amount of from about 1% to about 20% w/w of the waste stream material. In some embodiments, the waste stream material further comprises a plastic or thermoplastic material at an amount of from about 1% to about 10% w/w of the waste stream material. In some embodiments, the waste stream material further comprises a plastic or thermoplastic material at an amount of from about 1% to about 5% w/w of the waste stream material.

In some embodiments, the waste stream material further comprises an elastomeric material at an amount of from about 1% to about 50% w/w of the waste stream material. In some embodiments, the waste stream material further comprises an elastomeric material at an amount of from about 1% to about 40% w/w of the waste stream material. In some embodiments, the waste stream material further comprises an elastomeric material at an amount of from about 1% to about 30% w/w of the waste stream material. In some embodiments, the waste stream material further comprises an elastomeric material at an amount of from about 1% to about 20% w/w of the waste stream material. In some embodiments, the waste stream material further comprises an elastomeric material at an amount of from about 1% to about 10% w/w of the waste stream material. In some embodiments, the waste stream material further comprises an elastomeric material at an amount of from about 1% to about 5% w/w of the waste stream material.

In some embodiments, the waste stream material further comprises rubber at an amount of from about 1% to about 50% w/w of the waste stream material. In some embodiments, the waste stream material further comprises rubber at an amount of from about 1% to about 40% w/w of the waste stream material. In some embodiments, the waste stream material further comprises rubber at an amount of from about 1% to about 30% w/w of the waste stream material. In some embodiments, the waste stream material further comprises rubber at an amount of from about 1% to about 20% w/w of the waste stream material. In some embodiments, the waste stream material further comprises rubber at an amount of from about 1% to about 10% w/w of the waste stream material. In some embodiments, the waste stream material further comprises rubber at an amount of from about 1% to about 5% w/w of the waste stream material.

In some embodiments, the conglomerate resin is molded into a sheet.

In some embodiments, the conglomerate resin is machined into a sheet.

In some embodiments, the waste stream material has a mean particle size of less than 4 mm.

In one aspect, provided herein is a conglomerate resin, comprising:
  a) a waste stream material, wherein the waste stream material comprises:
    i) one or more species of wood at an amount of from about 1% to about 60% w/w of the waste stream material; and
    ii) a cast polyurethane at an amount of from about 1% to about 50% w/w of the waste stream material; and
    iii) a polyurethane foam at an amount of from about 1% to about 50% w/w of the waste stream material;
  b) an epoxy resin; and
  c) a hardener.

In some embodiments, the one or more species of wood is at an amount of from about 1% to about 5% w/w of the waste stream material. In some embodiments, the one or more species of wood is at an amount of from about 1% to about 10% w/w of the waste stream material. In some embodiments, the one or more species of wood is at an amount of from about 1% to about 20% w/w of the waste stream material. In some embodiments, the one or more species of wood is at an amount of about 60% w/w of the waste stream material.

In some embodiments, the cast polyurethane is at an amount of about 1% to about 40% w/w of the waste stream material. In some embodiments, the cast polyurethane is at an amount of about 36% w/w of the waste stream material. In some embodiments, the cast polyurethane is at an amount of from about 10% to about 40% w/w of the waste stream material. In some embodiments, the cast polyurethane is at an amount of from about 20% to about 40% w/w of the waste stream material. In some embodiments, the cast polyurethane is at an amount of from about 30% to about 40% w/w of the waste stream material.

In some embodiments, the polyurethane foam is at an amount of about 1% to about 50% w/w of the waste stream material. In some embodiments, the polyurethane foam is at an amount of about 1% to about 40% w/w of the waste stream material. In some embodiments, the polyurethane foam is at an amount of about 1% to about 30% w/w of the waste stream material. In some embodiments, the polyurethane foam is at an amount of about 1% to about 20% w/w of the waste stream material. In some embodiments, the polyurethane foam is at an amount of about 1% to about 10% w/w of the waste stream material. In some embodiments, the polyurethane foam is at an amount of about 1% to about 5% w/w of the waste stream material. In some embodiments, the polyurethane foam is at an amount of about 5% w/w of the waste stream material.

In some embodiments, a w/w ratio of the waste stream material and the epoxy resin plus the hardener is about 1 to about 1. In some embodiments, a w/w ratio of the epoxy resin and the hardener is about 100 to about 35. In some embodiments, a w/w ratio of the epoxy resin and the hardener is about 100 to about 25.

In one aspect, provided herein is a conglomerate resin, comprising:
a) a waste stream material, wherein the waste stream material comprises:
  i) fiberglass at an amount of from about 1% to about 50% w/w of the waste stream material;
  ii) a recycled epoxy resin at an amount of from about 1% to about 30% w/w of the waste stream material;
  iii) nylon at an amount of from about 1% to about 20% w/w of the waste stream material;
  iv) one or more species of wood at an amount of from about 1% to about 50% w/w of the waste stream material;
  v) a cast polyurethane at an amount of from about 1% to about 50% w/w of the waste stream material; and
  vi) a polyurethane foam at an amount of from about 1% to about 50% w/w of the waste stream material;
b) an epoxy resin; and
c) a hardener.

In some embodiments, the fiberglass is at an amount of from about 30% to 40% w/w of the waste stream material.

In some embodiments, the recycled epoxy resin is at an amount of from about 20% to 30% w/w of the waste stream material.

In some embodiments, the nylon is at an amount of from about 10% to 20% w/w of the waste stream material.

In some embodiments, the one or more species of wood is at an amount of from about 1% to about 5% w/w of the waste stream material. In some embodiments, the one or more species of wood is at an amount of from about 1% to about 10% w/w of the waste stream material. In some embodiments, the one or more species of wood is at an amount of from about 1% to about 20% w/w of the waste stream material. In some embodiments, the one or more species of wood is at an amount of from about 10% to about 20% w/w of the waste stream material. In some embodiments, the one or more species of wood is at an amount of from about 20% to about 30% w/w of the waste stream material. In some embodiments, the one or more species of wood is at an amount of from about 30% to about 40% w/w of the waste stream material. In some embodiments, the one or more species of wood is at an amount of from about 40% to about 50% w/w of the waste stream material.

In some embodiments, the cast polyurethane is at an amount of from about 1% to about 5% w/w of the waste stream material. In some embodiments, the cast polyurethane is at an amount of from about 1% to about 10% w/w of the waste stream material. In some embodiments, the cast polyurethane is at an amount of from about 1% to about 20% w/w of the waste stream material. In some embodiments, the cast polyurethane is at an amount of from about 10% to about 20% w/w of the waste stream material. In some embodiments, the cast polyurethane is at an amount of from about 20% to about 30% w/w of the waste stream material. In some embodiments, the cast polyurethane is at an amount of from about 30% to about 40% w/w of the waste stream material. In some embodiments, the cast polyurethane is at an amount of from about 40% to about 50% w/w of the waste stream material. In some embodiments, the cast polyurethane is at an amount of about 9% w/w of the waste stream material.

In some embodiments, the polyurethane foam is at an amount of from about 1% to about 5% w/w of the waste stream material. In some embodiments, the polyurethane foam is at an amount of from about 1% to about 10% w/w of the waste stream material. In some embodiments, the polyurethane foam is at an amount of from about 1% to about 20% w/w of the waste stream material. In some embodiments, the polyurethane foam is at an amount of from about 10% to about 20% w/w of the waste stream material. In some embodiments, the polyurethane foam is at an amount of from about 20% to about 30% w/w of the waste stream material. In some embodiments, the polyurethane foam is at an amount of from about 30% to about 40% w/w of the waste stream material. In some embodiments, the polyurethane foam is at an amount of from about 40% to about 50% w/w of the waste stream material. In some embodiments, the polyurethane foam is at an amount of about 9% w/w of the waste stream material. In some embodiments, the polyurethane foam is at an amount of about 2% w/w of the waste stream material.

In some embodiments, a w/w ratio of the waste stream material and the epoxy resin plus the hardener is about 1 to about 1. In some embodiments, a w/w ratio of the epoxy resin and the hardener is about 100 to about 35. In some embodiments, a w/w ratio of the epoxy resin and the hardener is about 100 to about 25.

In one aspect, provided herein is a boot plate comprising the conglomerate resin described in any one of the aspects above.

In some embodiments, the boot plate has a length of from about 300 mm to about 600 mm. In some embodiments, the boot plate has a length of about 560 mm.

In some embodiments, the boot plate has a width of from about 20 mm to about 80 mm. In some embodiments, the boot plate has a width of about 60 mm.

In some embodiments, when a screw pull-out test is performed on the boot plate, an average pull-out force at failure on the boot plate is at least 300 ft-lbs. In some embodiments, when a screw pull-out test is performed on the boot plate, an average pull-out force at failure on the boot plate is at least 400 ft-lbs. In some embodiments, when a screw pull-out test is performed on the boot plate, an average pull-out force at failure on the boot plate is from about 400 ft-lbs to about 500 ft-lbs.

In one aspect, provided herein is a conglomerate resin, comprising:
a) a waste stream material;
b) an epoxy resin; and
c) a hardener,
wherein the epoxy resin plus the hardener is at least about 30% w/w of the conglomerate resin.

In some embodiments, the epoxy resin plus the hardener is at least about 40%, at least about 50%, at least about 60%, at least about 70%, at least about 80%, or at least about 90% w/w of the conglomerate resin.

In some embodiments, the waste stream material is from about 50% to about 70% w/w of the conglomerate resin.

In some embodiments, the epoxy resin plus the hardener is from about 30% to about 50% w/w of the conglomerate resin. In some embodiments, the epoxy resin plus the hardener is about 30%, about 35%, about 40%, about 45%, or about 50% w/w of the conglomerate resin.

In some embodiments, a w/w ratio of the waste stream material and the epoxy resin plus the hardener is about 1 to about 1.

In some embodiments, a w/w ratio of the waste stream material and the epoxy resin plus hardener is between about 4:5 to 7:3, between about 2:3 and 3:2, between about 3:4 and 4:3, or between about 4:5 and 5:4.

In some embodiments, a w/w ratio of the waste stream material and the epoxy resin plus the hardener is about 7 to about 3.

In some embodiments, a w/w ratio of the waste stream material and the epoxy resin plus the hardener is about 6 to about 4.

In some embodiments, a w/w ratio of the epoxy resin to the hardener is between about 2:1 to about 6:1, between about 3:1 to about 4:1, or between about 2.5:1 to about 5:1.

In one aspect, provided herein is a display stand (e.g., a ski stand) comprising the conglomerate resin of any one of the aspects above. In some embodiments, the display stand is constructed by assembly of one or more sheets of the conglomerate resin of any one of the aspects above. In some embodiments, the display stand is a ski stand.

What is claimed is:

1. A conglomerate resin, comprising:
   a) a waste stream material, wherein the waste stream material comprises a polyurethane, wherein the polyurethane is formulated with a biobased polyol derived from a microbial oil, wherein the waste stream material is from about 50% to about 90% weight-by-weight (w/w) of the conglomerate resin;
   b) an epoxy resin, wherein the epoxy resin is from about 1% to about 25% w/w of the conglomerate resin; and
   c) a hardener, wherein the hardener is from about 1% to about 25% w/w of the conglomerate resin.

2. The conglomerate resin of claim 1, wherein a w/w ratio of the waste stream material and the epoxy resin plus the hardener is about 1 to about 1.

3. The conglomerate resin of claim 1, wherein a w/w ratio of the epoxy resin and the hardener is about 100 to about 35.

4. The conglomerate resin of claim 1, wherein a w/w ratio of the epoxy resin and the hardener is about 100 to about 25.

5. The conglomerate resin of claim 1, wherein the waste stream material is about 50% w/w of the conglomerate resin, wherein the epoxy resin is about 25% w/w of the conglomerate resin, and wherein the hardener is about 25% w/w of the conglomerate resin.

6. The conglomerate resin of claim 1, wherein the waste stream material comprises the polyurethane at an amount of from about 10% to about 100% w/w of the waste stream material.

7. The conglomerate resin of claim 1, wherein the waste stream material is derived from manufacture of a sporting goods equipment.

8. The conglomerate resin of claim 7, wherein the sporting goods equipment is a ski, a snowboard, or a split board.

9. The conglomerate resin of claim 1, wherein the polyurethane comprises a cast polyurethane.

10. The conglomerate resin of claim 1, wherein the polyurethane comprises a polyurethane foam.

11. The conglomerate resin of claim 1, wherein the polyurethane has a biobased content of from about 40% to about 90%.

12. The conglomerate resin of claim 1, wherein the microbial oil is derived from a microalgae.

13. The conglomerate resin of claim 1, wherein the biobased polyol has a C18:1 content of at least 60%.

14. The conglomerate resin of claim 1, wherein the waste stream material further comprises one or more species of wood at an amount of from about 1% to about 60% w/w of the waste stream material.

15. The conglomerate resin of claim 1, wherein the waste stream material further comprises recycled or post manufacturing waste fiberglass at an amount of from about 1% to about 40% w/w of the waste stream material.

16. The conglomerate resin of claim 1, wherein the waste stream material further comprises recycled or post manufacturing waste nylon at an amount of from about 1% to about 20% w/w of the waste stream material.

17. The conglomerate resin of claim 1, wherein the waste stream material further comprises an elastomeric material at an amount of from about 1% to about 50% w/w of the waste stream material.

18. The conglomerate resin of claim 1, wherein the waste stream material further comprises rubber at an amount of from about 1% to about 50% w/w of the waste stream material.

19. The conglomerate resin of claim 1, wherein the conglomerate resin is molded into a sheet.

20. The conglomerate resin of claim 1, wherein the conglomerate resin is machined into a sheet.

21. The conglomerate resin of claim 1, wherein the waste stream material has a mean particle size of less than 4 mm.

22. A conglomerate resin, comprising:
   a) a waste stream material, wherein the waste stream material comprises a polyurethane, wherein the polyurethane is formulated with a biobased polyol, wherein the biobased polyol has a C18:1 content of at least 60%, wherein the waste stream material is from about 50% to about 90% weight-by-weight (w/w) of the conglomerate resin;
   b) an epoxy resin, wherein the epoxy resin is from about 1% to about 25% w/w of the conglomerate resin; and
   c) a hardener, wherein the hardener is from about 1% to about 25% w/w of the conglomerate resin.

* * * * *